US011789680B2

(12) United States Patent
Kanamoto et al.

(10) Patent No.: US 11,789,680 B2
(45) Date of Patent: Oct. 17, 2023

(54) WORKFLOW CONTROL SYSTEM, WORKFLOW CONTROL METHOD, AND STORAGE MEDIUM

(71) Applicant: CANON KABUSHIKI KAISHA, Tokyo (JP)

(72) Inventors: Yoshiji Kanamoto, Tokyo (JP); Toshihiko Iida, Ibaraki (JP); Kimio Hayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/748,101

(22) Filed: May 19, 2022

(65) Prior Publication Data

US 2022/0382498 A1 Dec. 1, 2022

(30) Foreign Application Priority Data

May 25, 2021 (JP) ................................ 2021-087811

(51) Int. Cl.
*G06F 3/12* (2006.01)

(52) U.S. Cl.
CPC .......... *G06F 3/1255* (2013.01); *G06F 3/1204* (2013.01)

(58) Field of Classification Search
None
See application file for complete search history.

(56) References Cited

U.S. PATENT DOCUMENTS

2008/0174818 A1* 7/2008 Kanamoto ............ G06F 3/1285 358/1.15
2017/0351467 A1* 12/2017 Wakabayashi ............ G06F 9/48
2019/0095154 A1* 3/2019 Hayashi ................ G06F 3/1204

FOREIGN PATENT DOCUMENTS

EP 1531610 A2 5/2005
JP 2004213378 A 7/2004

OTHER PUBLICATIONS

Extended European search report issued in European Appln. No. 22172849.6 dated Nov. 2, 2022.
"PrintTalk Specification 2.1",CIPA Organization, Aug. 16, 2020: pp. 1-62, XP055972671, Retrieved from the Internet: URL:https://www.cip4.org/files/cip4/documents/PrintTalk%20Specification%202.1 pdf. Cited in NPL 1.

* cited by examiner

*Primary Examiner* — Frantz Bataille
(74) *Attorney, Agent, or Firm* — ROSSI, KIMMS & McDOWELL LLP

(57) ABSTRACT

A workflow control method is provided for processing, by an information processing apparatus, submission data in each process of a workflow to produce a print product. In the method, the submission data is accepted by the information processing apparatus. If new submission data to original submission data is submitted, it is determined whether a current processing step for the original submission data is a specific process or a process after that. If it is determined that the current processing step is the specific process or the process after that, the new submission data is not accepted, and otherwise, the new submission data is accepted.

11 Claims, 26 Drawing Sheets

FIG. 3

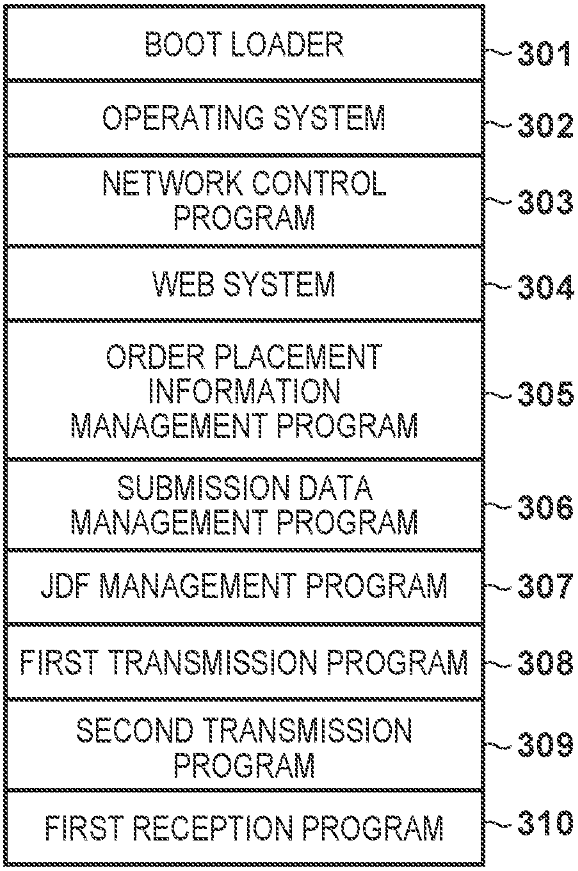

FIG. 4

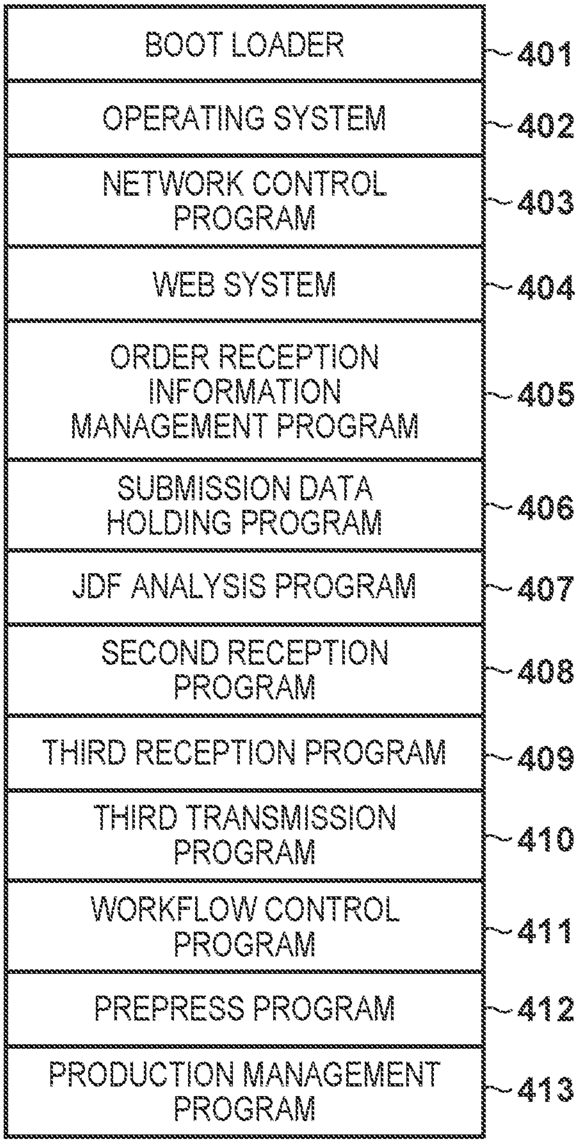

| | |
|---|---|
| BOOT LOADER | ~301 |
| OPERATING SYSTEM | ~302 |
| NETWORK CONTROL PROGRAM | ~303 |
| WEB SYSTEM | ~304 |
| ORDER PLACEMENT INFORMATION MANAGEMENT PROGRAM | ~305 |
| SUBMISSION DATA MANAGEMENT PROGRAM | ~306 |
| JDF MANAGEMENT PROGRAM | ~307 |
| FIRST TRANSMISSION PROGRAM | ~308 |
| SECOND TRANSMISSION PROGRAM | ~309 |
| FIRST RECEPTION PROGRAM | ~310 |

| | |
|---|---|
| BOOT LOADER | ~401 |
| OPERATING SYSTEM | ~402 |
| NETWORK CONTROL PROGRAM | ~403 |
| WEB SYSTEM | ~404 |
| ORDER RECEPTION INFORMATION MANAGEMENT PROGRAM | ~405 |
| SUBMISSION DATA HOLDING PROGRAM | ~406 |
| JDF ANALYSIS PROGRAM | ~407 |
| SECOND RECEPTION PROGRAM | ~408 |
| THIRD RECEPTION PROGRAM | ~409 |
| THIRD TRANSMISSION PROGRAM | ~410 |
| WORKFLOW CONTROL PROGRAM | ~411 |
| PREPRESS PROGRAM | ~412 |
| PRODUCTION MANAGEMENT PROGRAM | ~413 |

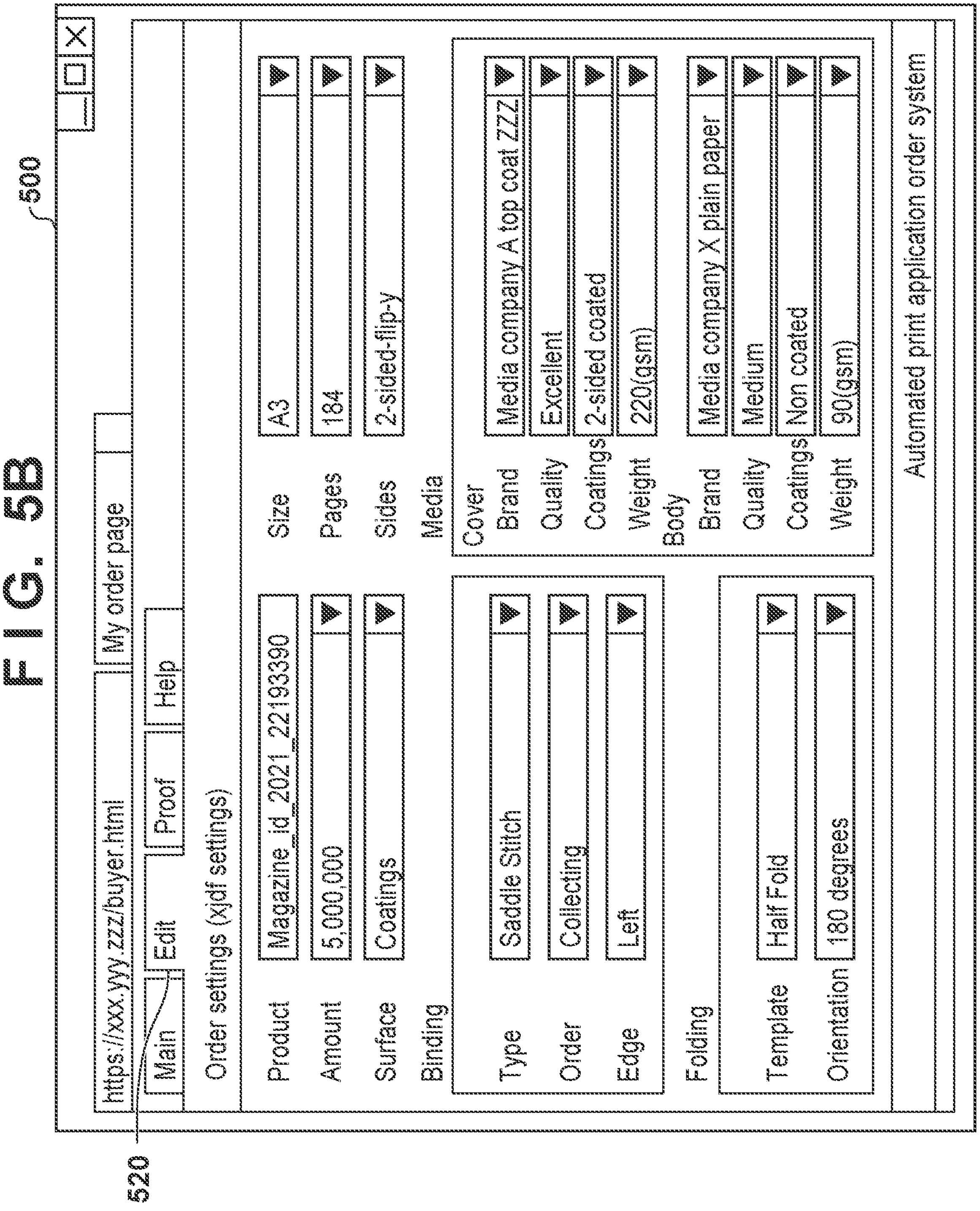

FIG. 5B https://xxx.yyy.zzz/buyer.html

| Main | Edit | Proof | Help | My order page |

Order settings (xjdf settings)

| Product | Magazine_id_2021_22193390 |
| Amount | 5,000,000 ▶ |
| Surface | Coatings ▶ |
| Binding | |
| Type | Saddle Stitch ▶ |
| Order | Collecting ▶ |
| Edge | Left ▶ |
| Folding | |
| Template | Half Fold ▶ |
| Orientation | 180 degrees ▶ |

| Size | A3 ▶ |
| Pages | 184 ▶ |
| Sides | 2-sided-flip-y ▶ |
| Media | |
| Cover | |
| Brand | Media company A top coat ZZZ ▶ |
| Quality | Excellent ▶ |
| Coatings | 2-sided coated ▶ |
| Weight | 220(gsm) ▶ |
| Body | |
| Brand | Media company X plain paper ▶ |
| Quality | Medium ▶ |
| Coatings | Non coated ▶ |
| Weight | 90(gsm) ▶ |

Automated print application order system

```
<PurchaseOrder TimeStamp="2021-01-14T11:30:00+0900"
QuoteID="XXXXX" BuisinessID="YYYYY" PrintProviderName="BBB Printer"
BuyerName="AAA00000">

<xjdf:XJDF JobID="item1" Types="Product">
<xjdf:ProductList>
<xjdf:Product Amount="5000000" DescriptiveName="Magazine_id_2021_22193390"
  Surface="Coating" Dimension="1191 842" Pages="184" Sides="TwoSidedFlipY"
     ⋮
  />
</xjdf:ProductList>
</xjdf:XJDF>

</PurchaseOrder>
```

```
<PurchaseOrderResponse TimeStamp="2021-01-14T12:30:00+0900"
 RefID="YYYYY" PrintProviderName="BBB Printer" BuyerName="AAA00000"
 OrderStatus="Accepted">

</Comment>
Thank  you for always using our company.
</Comment>

</PurchaseOrder>
```

```
<ContentDelivery TimeStamp="2021-01-15T12:15:00+0900"
BuisinessID="YYYYY" PrintProviderName="BBB Printer" BuyerName= "AAA00000"
UpdateMethod="Add">

<xjdf:XJDF JobID="item1" Types="Product Delivery">
<xjdf:ResourceSet Name="RunList" Usage="Input">
<xjdf:Resource>
<xjdf:RunList>
<xjdf:FileSpec MimeType="Application/pdf" URL="file:///808Content3.pdf"/>
</xjdf:RunList>
</xjdf:Resource>
</xjdf:ResourceSet>
</xjdf:XJDF>

</ContentDelivery>
```

```
<ContentDeliveryResponse TimeStamp="2021-01-15T13:30:00+0900"
 RefID="YYYYY" PrintProviderName="BBB Printer" BuyerName= "AAA00000"
 Result="AcceptedWaiting">

<xjdf:XJDF JobID="item1" File="Content3.pdf">
<xjdf:ResourceSet Name="AuditPool">
<xjdf:Resource>
<xjdf:AuditPool>
<xjdf:PreFlightReport Result="success">
</xjdf:AuditPool>
</xjdf:Resource>
</xjdf:ResourceSet>
</xjdf:XJDF>

</ContentDelivery>
```

```
<ContentDelivery TimeStamp="2021-01-17T08:00:00+0900"
BuisinessID="YYYYY" PrintProviderName="BBB Printer" BuyerName= "AAA00000"
UpdateMethod="Add">

<xjdf:XJDF JobID="item1" Types="Product Delivery">
<xjdf:ResourceSet Name="RunList" Usage="Input">
<xjdf:Resource>
<xjdf:RunList>
<xjdf:FileSpec MimeType="Application/pdf" URL="file:///Content3.pdf"/>
</xjdf:RunList>
</xjdf:Resource>
</xjdf:ResourceSet>
</xjdf:XJDF>

</ContentDelivery>
```

```
<ContentDeliveryResponse TimeStamp="2021-01-15T13:30:00+0900"
 RefID="YYYYY" PrintProviderName="BBB Printer" BuyerName= "AAA00000"
 Result="Accepted">

<xjdf:XJDF JobID="item1" File="Content3.pdf">
<xjdf:ResourceSet Name="AuditPool">
<xjdf:Resource>
<xjdf:AuditPool>
<xjdf:PreFlightReport Result="success">
</xjdf:AuditPool>
</xjdf:Resource>
</xjdf:ResourceSet>
</xjdf:XJDF>

</ContentDelivery>
```

| | 1202 | 1203 | 1204 |
|---|---|---|---|
| | STEP | EXECUTION MEANS | AUTOMATIC/ MANUAL |
| 1002 | DOCUMENT SUBMISSION PROCESS | PROGRAM | AUTOMATIC |
| 1003 | PREFLIGHT PROCESS | PROGRAM | AUTOMATIC |
| 1004 | FIRST HOLDING PROCESS | PROGRAM | AUTOMATIC |
| 1006 | PREPRESS PROCESS | HUMAN WORK | MANUAL (1205) |
| 1007 | SECOND HOLDING PROCESS | PROGRAM | AUTOMATIC |
| 1005 | PRODUCTION PLAN PROCESS | PROGRAM | AUTOMATIC |
| 1008 | PRESS PROCESS | APPARATUS | APPARATUS |
| 1009 | POST-PRESS PROCESS | APPARATUS | MANUAL |
| 1010 | SHIPPING PROCESS | PROGRAM | MANUAL |

F I G. 15
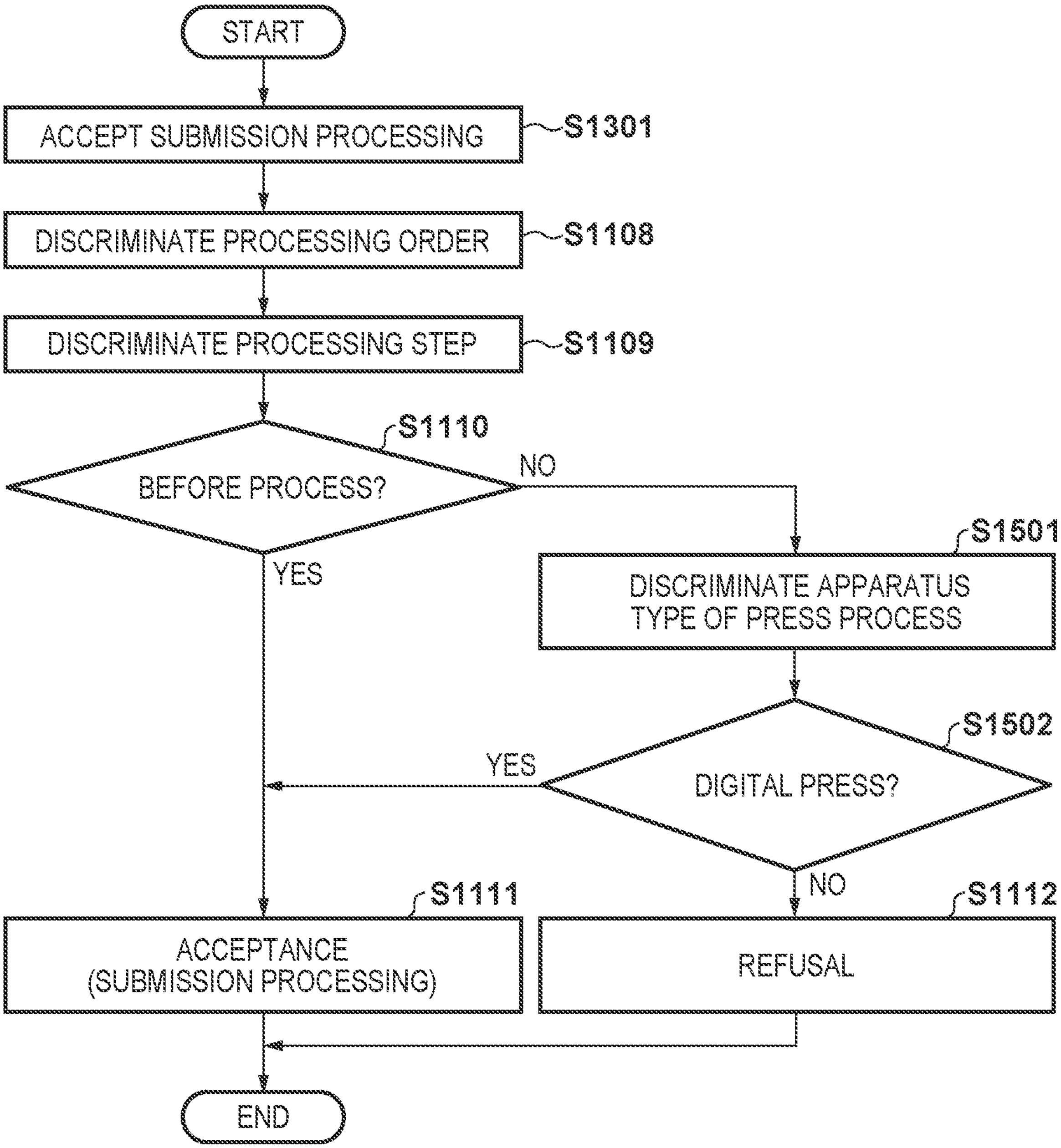

WORKFLOW CONTROL SYSTEM, WORKFLOW CONTROL METHOD, AND STORAGE MEDIUM

BACKGROUND OF THE INVENTION

Field of the Invention

The present invention relates to a workflow system and, more particularly, to a workflow control system for order placement and manufacturing of a print product, a workflow control method, and a storage medium.

Description of the Related Art

In the field of commercial printing, the importance of electronic order placement/order reception such as web order placement and a printing company providing an electronic document submission system and requirement for that are growing in recent years.

In response to these requirements, some printing companies have released an order placement/order reception systems based on a web system. With a background of such a widespread electronic order placement/order reception work, there also exist standard specifications of electronic transaction data such as PrintTalk to guarantee commonality and prevent an order reception system or an order placement system from differing from company to company. The standard specifications are formulated for the purpose of making various kinds of commands and information to be exchanged common in the order placement/order reception work and making the system common to allow both an order receiver and an orderer to enjoy convenience.

However, the electronic document submission system that performs order placement/order reception of a print product and submission processing in the conventional technique has other problems in providing convenience to a user. More specifically, the following problems exist.

In general, as the business format of print product order placement/order reception work, an orderer gives the outline of order placement contents of a product to a printing company, acquires an estimate, and performs order placement processing based on the estimate. When performing order placement processing, the printing company may request the orderer to provide submission data that is print target data. As the conventional practice of the order placement/order reception work of a print product, creation of submission data is not necessarily completed until the order placement stage, and data is submitted after order placement. In other words, order placement processing and submission processing are executed as different processes. Also, submission processing may be executed repetitively several times due to correction, replacement, or addition. The submission processing that may be executed later a plurality of times is also taken into consideration in the standard specifications of electronic transaction data such as PrintTalk. That is, even in the system complying with the standard specifications of electronic transaction data, the orderer of a print product can execute creation of submission data and document submission of the conventional non-digitized practice in accordance with a similar practice. Japanese Patent Laid-Open No. 2004-213378 describes a technique aiming at executing, after document submission, correction request by an electronic means for data that has undergone submission processing.

However, since additional document submission or replacement document submission based on the practice of the printing industry as described above is not permitted, a solution of the problem is not provided.

On the other hand, it is known that upon receiving order placement processing from an orderer, a printing company starts preparation to execute a workflow built in the printing company without waiting for reception of submission data. More specifically, based on information received from the orderer, necessary items are input to a system called a MIS system configured to manage the overall document submission/order reception work. Also, processes necessary for performing production are discriminated based on the information received in order reception, processes to be executed internally and the order thereof are decided, and preparation for production is executed. Even after document submission, preparation such as calibration printing may be performed before actual production. For this reason, if document submission or resubmission occurs after order placement, the preparation work needs to be redone depending on the contents.

That is, the orderer may send submission data several times at any timing on the circumstances of the orderer after order placement to the printing company. On the other hand, document submission on the circumstances of the orderer may be an impediment to an efficient production work of the print product ordered by the orderer. Thus, there are essential incompatible circumstances between document submission on the circumstances of the orderer and the efficiency of works in the printing company. To these difficult circumstances, a solution to achieve a realistic and efficient order placement/order reception work for an electronic print product has not been provided so far.

SUMMARY OF THE INVENTION

The present invention has been made in consideration of the above-described situation. That is, the present invention has as its object to simultaneously implement a flexible document submission timing and efficient execution of workflow processing.

In order to achieve the above object, the present invention has the following configuration. That is, the present invention in a first aspect provides a workflow control system configured to process submission data in each process of a workflow to produce a print product, comprising at least one memory that stores at least one program, and at least one processor, wherein when executed by the at least one processor, the at least one program causes the at least one processor to operate as: a document submission unit configured to accept the submission data; and a determination unit configured to, if new submission data to original submission data is submitted, determine whether a current processing step for the original submission data is a specific process or a process after that, and if the determination unit determines that the current processing step is the specific process or the process after that, the document submission unit does not accept the new submission data, and otherwise, accepts the new submission data.

Further features of the present invention will become apparent from the following description of exemplary embodiments with reference to the attached drawings.

BRIEF DESCRIPTION OF THE DRAWINGS

FIG. 3 is a view showing the software configuration of a first information processing apparatus according to the first embodiment;

FIG. 4 is a view showing the software configuration of a second information processing apparatus according to the first embodiment;

FIGS. 5A and 5B are explanatory views of the operation procedure of the first information processing apparatus according to the first embodiment;

FIGS. 9A-1 and 9A-2 are views for explaining an example of information exchanged between the first and second information processing apparatuses according to the first embodiment;

FIGS. 9B-1 and 9B-2 are views for explaining an example of information exchanged between the first and second information processing apparatuses according to the first embodiment;

FIGS. 9C-1 and 9C-2 are views for explaining an example of information exchanged between the first and second information processing apparatuses according to the first embodiment;

FIG. 12B is a view showing an example of a management table provided in a workflow control program;

FIG. 15 is a flowchart for explaining acceptance and acceptability discrimination of submission processing according to the fifth embodiment;

DESCRIPTION OF THE EMBODIMENTS

Figure 1:
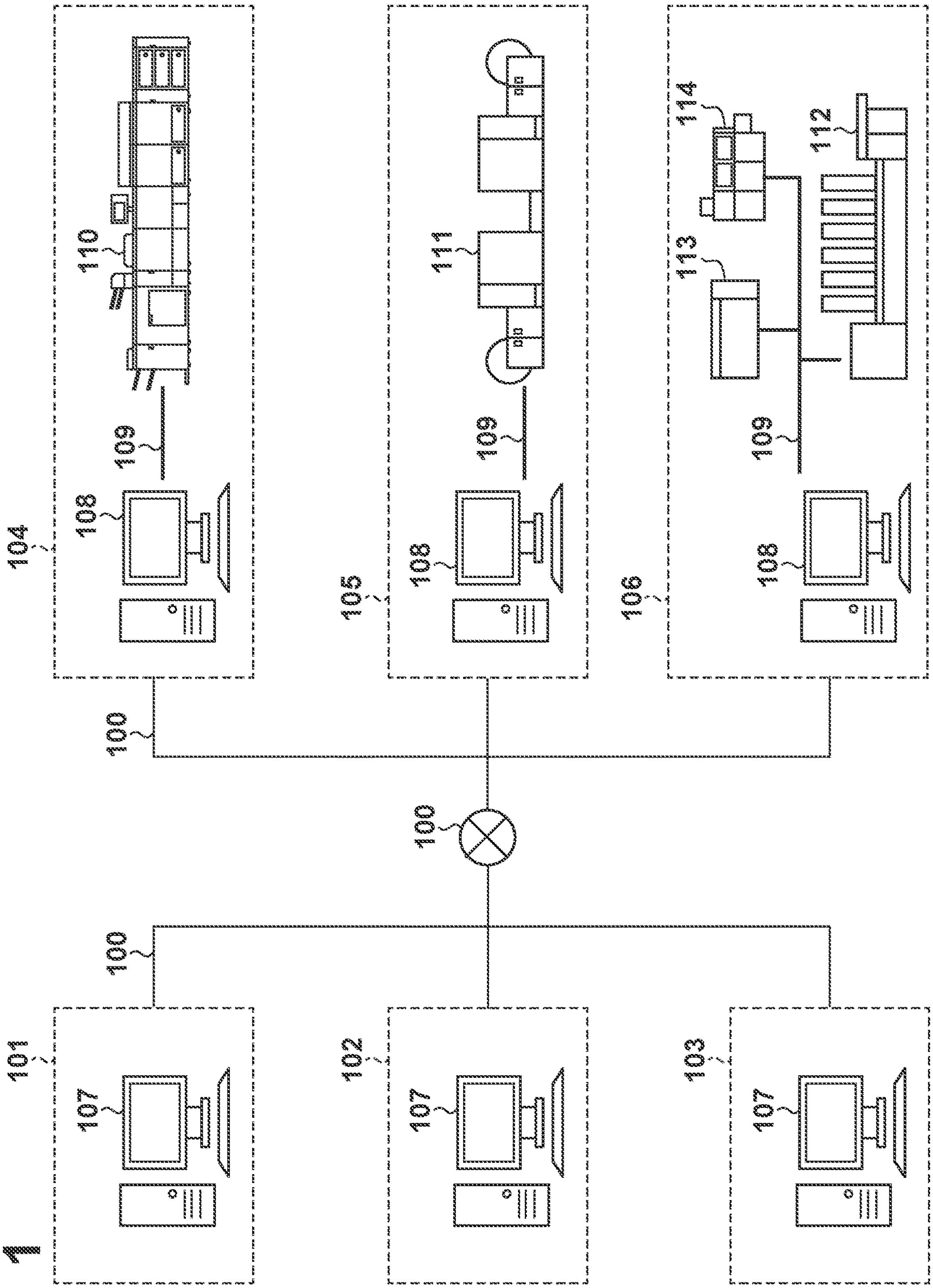
FIG. 1 is a block diagram showing the whole of an order placement/order reception system and a printing company system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Configuration of Order Placement/Order Reception System

FIG. 1 is a block diagram showing an order placement/order reception system according to the first embodiment. The order placement/order reception system includes orderer systems 101, 102, and 103, and printing company systems 104, 105, and 106, and these are connected to each other by the Internet 100. Each of the orderer systems 101, 102, and 103 includes at least one information processing apparatus 107.

The internal configurations of the printing company systems 104, 105, and 106 will be described below in detail. Note that the printing company system may also be called a workflow control system or a printing system. As shown in FIG. 1, a plurality of apparatuses are connected to each other by a network 109. Examples of the plurality of apparatuses are an information processing apparatus 108, image forming apparatuses 110, 111, and 112, a laminator 114, and a CTP (Computer To Plate) 113.

The image forming apparatus 110 is a cut sheet type digital printing press. The image forming apparatus 111 is a digital printing press for continuous form sheet. The image forming apparatus 112 is an offset printing press. Each printing company normally holds a plurality of apparatuses of different functions, performances, and methods, selects an optimum image forming apparatus in consideration of various conditions such as the contents of a received order, the number of products, the unit price of a print product, and quality, and performs production.

Each apparatus is controlled under a workflow software group operating on the information processing apparatus 108, processes electronic transaction data received from the orderer systems 101, 102, and 103 and submitted data (submission data), and produces a product. The product is also called a print product, and includes various kinds of print products, for example, a leaflet made only by printing on a cut sheet, a sheet that has undergone post-processing such as cutting processing or coating, and a booklet bound by stapling or perfect binding. In addition, transmission/reception of requests concerning order placement/order reception of a print product between the orderer systems 101, 102, and 103 and the printing company systems 104, 105, and 106 is achieved by mutually transmitting/receiving a common electronic format via the Internet 100.

Here, the advantages of the common electronic format transmitted/received in the order placement/order reception processing performed between the plurality of different orderer systems 101, 102, and 103 and the plurality of different printing company systems 104, 105, and 106 are as follows.

First, even when selecting one of a plurality of printing company systems and ordering a print product, the orderer system need not perform order placement/order reception processing in a different mode for a specific system uniquely provided by each printing company system. This is because the processing can be achieved by using a common order placement system using the common electronic format. In other words, even different printing companies can provide a common system to the orderer systems 101, 102, and 103. That is, even if order placement is performed for a plurality of printing companies, various kinds of processes associated with order placement are unified. As the effect, efficiency/commonality and automation of various kinds of works associated with order placement are promoted.

Second, on the side of the printing company systems 104, 105, and 106 as well, it is unnecessary to execute order placement/order reception concerning manufacturing works of a print product in different forms from the plurality of different orderer systems 101, 102, and 103. This is because it is possible to use a common order reception system by the common electronic format. In other words, even if orders of works are received from a plurality of different orderers, the order receiving side can execute order reception processing by a unified method. As the effect, efficiency/commonality and automation of various kinds of works associated with order reception in the printing company systems are promoted.

In addition to the above-described advantages, various advantages can be obtained when the orderer systems 101, 102, and 103 and the printing company systems 104, 105, and 106 integrally use the print product order placement/order reception system under the control of the common electronic format. For example, assume a case in which not a printing company to which a work has conventionally been outsourced but another printing company is newly requested to manufacture a print product of the same contents. Pieces of information transmitted/received in association with order placement/order reception have a common electronic format, and systems held by the order receiver and the orderer are configured to electronically process order placement/order reception works in accordance with the common electronic format. Hence, even when newly requesting the printing company that is different from the conventional printing company to manufacture the print product, the orderer need not be conscious of the change of the company to which the manufacturing is outsourced. It is therefore possible to flexibly change the printing company requested to do manufacturing, unlike the conventional system.

There is also another advantage as shown below. Since electronic data and commands transmitted/received between an orderer and a printing company at the time of order placement/order reception are common, it is easy to minimize specific factors such as the practices of the industry and the business format that changes between companies as in the conventional practice. That is, it is possible to easily embody a system configuration advantageous in automating some or all of various kinds of processes requested in the order placement/order reception work.

Also, assume printing companies that do not have an electronic document submission system such as web document submission presently. It is considered that even in these companies, an orderer system or printing system that is configured to transmit/receive common electronic data and command and formed as a library, or is distributed as a standard application is introduced more easily than before. It is thus possible to bring advantages to the whole industry where order placement/order reception works for print products are performed.

Also, if the printing company systems 104, 105, and 106 respectively hold the image forming apparatuses 110, 111, and 112 of different types such as functions, performances, and methods, it is possible to easily implement orderer's selection of a printing company of an advantageous condition. Here, conditions used by the orderer to select the printing company include a production quantity, quality, delivery date, and features of the image forming apparatus held by the printing company.

Figure 2:
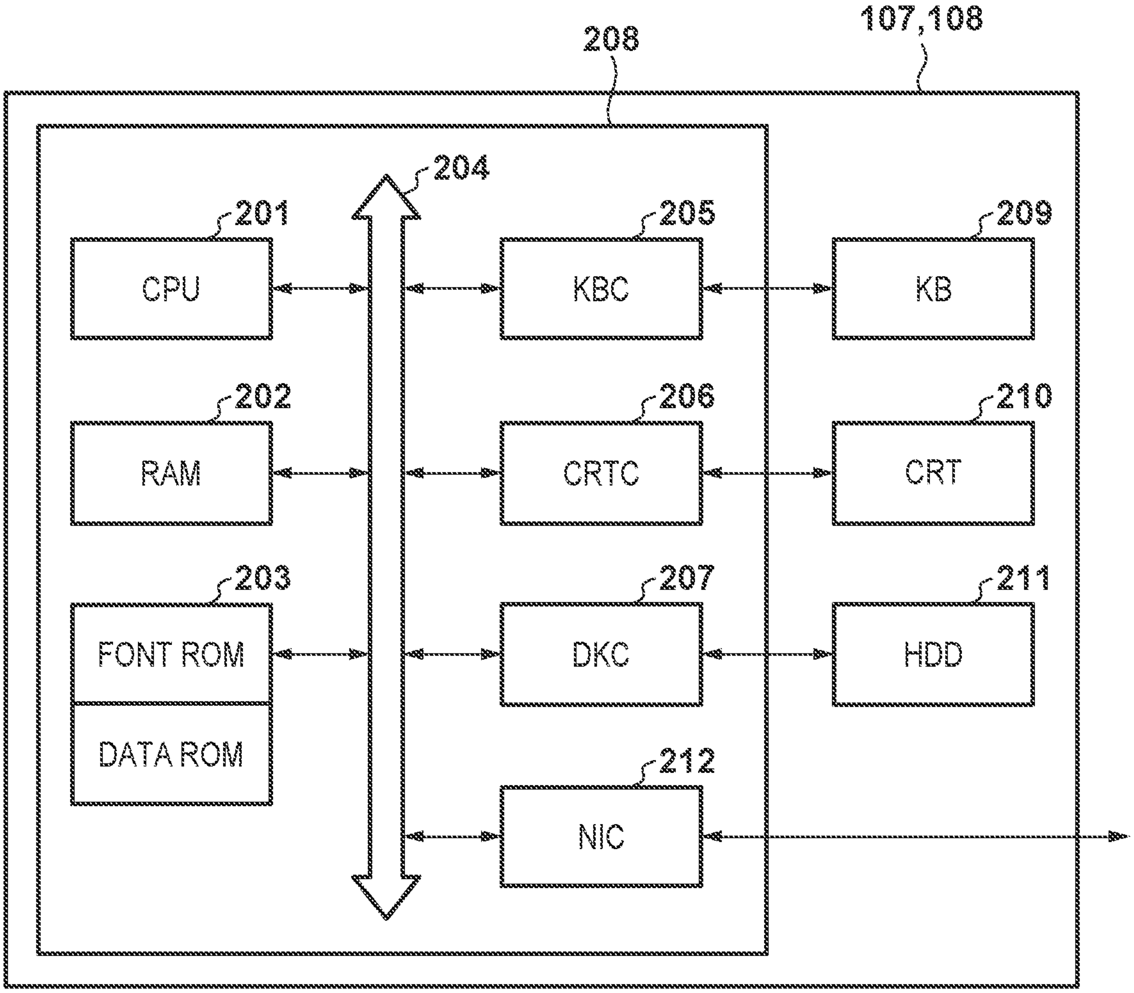
FIG. 2 is a block diagram showing the hardware configuration of an information processing apparatus according to the first embodiment.

FIG. 2 is a block diagram showing the configuration of the information processing apparatuses 107 and 108. Referring to FIG. 2, a CPU 201 executes the programs of an OS and general applications stored in the program ROM of a ROM 203 or loaded from an HDD 211 to a RAM 202. The ROM 203 also includes a font ROM and a data ROM. The RAM 202 functions as the main memory, work area, and the like of the CPU 201. A keyboard controller (KBC) 205 controls input from a keyboard or a pointing device (not shown). A display controller CRTC 206 controls display on a display unit CRT 210. Note that although the display unit is a CRT here, a display of another type such as a liquid crystal display may be employed. A disk controller (DKC) 207 controls access to the HDD 211 and the like, which store a boot program, various kinds of applications, and font data. A network controller (NIC) 212 is connected to a network and executes communication control processing to another apparatus connected to the network. A bus 204 connects the CPU 201, the RAM 202, the ROM 203, and various kinds of controllers, and transports data signals and control signals.

Note that a portable terminal may include, in the configuration, a touch panel controller or the like in place of the keyboard controller (KBC) 205. Also, a mass storage device that replaces the HDD 211 may be provided. Furthermore, the internal configuration of the network controller (NIC) 212 changes between a case in which the apparatus provided with that uses a wired LAN, a case in which the apparatus uses a wireless LAN, and a case in which the apparatus uses both. However, the differences of the internal configuration are hidden in the network controller (NIC) 212, and the system can be controlled by the configuration that is equivalent to the remaining modules shown in FIG. 2.

Software Configuration

FIG. 3 is a view showing the configuration of programs held by the information processing apparatus 107 in each of the orderer systems 101, 102, and 103. A boot loader 301 is a program executed immediately after the information processing apparatus 107 is powered on. These programs include a program configured to execute various kinds of activation sequences necessary for activation of the system. An operating system 302 is a program aiming at providing an execution environment for various kinds of programs that implement the functions of the information processing apparatus 107. This provides a function of managing the memories of the information processing apparatus, that is, resources such as the ROM 203, the RAM 202, and the HDD 211.

A network control program 303 is a program to be executed when data is transmitted/received to/from an apparatus connected via a network. That is, the network control program 303 is software used to control the NIC 212 and transmit/receive data or a file to/from the outside via the Internet 100. A web system 304 is a program configured to control reception or acceptance of a web-based service from an external apparatus connected via the network or transmission of data and commands to an external web service.

An order placement information management program 305 is a program that plays a central role in the orderer systems 101, 102, and 103. The order placement information management program 305 transmits requests by various kinds of commands associated with order placement to the external printing company systems 104, 105, and 106, receives and interprets a response as the result, and provides an instruction portion configured to cause an operator to execute the various kinds of commands. Various kinds of commands here and the execution order of these will be described later.

A submission data management program 306 is configured to manage original data of a print product to be ordered, that is, original image data. Only to hold original image data until transmission, the function of a file system provided in the operating system 302 can directly be used. In this embodiment, however, the submission data management program 306 is assumed to include a program to be used when executing processing of data and creation and editing of contents.

A JDF management program 307 is a program used to execute creation and editing of a file in a JDF format that electronically expresses the form of a print product when placing the order of the print product to the printing company systems 104, 105, and 106. JDF information edited or created by this program is transmitted by the order placement information management program 305 to the printing company systems 104, 105, and 106 when placing the order of print product manufacturing.

A first transmission program 308 performs transmission processing of various kinds of commands to be transmitted from the orderer systems 101, 102, and 103 to the printing company systems 104, 105, and 106 in order placement/order reception processing. Commands to be transmitted by the first transmission program 308 will be described later.

After, of the various kinds of commands as the transmission target of the first transmission program 308, an order placement command is transmitted and accepted, a second transmission program 309 transmits submission data that is print target data. Submission data and the operation of the second transmission program will be described later.

A first reception program 310 receives response data that is a result obtained by transmitting commands and data by the first transmission program 308 and the second transmission program 309 to the printing company systems 104, 105, and 106 and processing these. The first reception program 310 also analyzes the received result.

FIG. 4 is a view showing the configuration of programs held by the information processing apparatus 108 in each of the printing company systems 104, 105, and 106. The processing contents and roles of a boot loader 401, an operating system 402, a network control program 403, and a web system 404 are the same as the corresponding portions 301-304 shown in FIG. 3, and a description thereof will be omitted.

An order reception information management program 405 is a program that plays a central role in the printing company systems 104, 105, and 106, and is sometimes called a MIS system. The order reception information management program 405 receives requests by various kinds of commands associated with order placement of a print product by the orderer systems 101, 102, and 103, transmits a response as an execution result, and provides an instruction portion configured to cause an operator to execute the various kinds of commands. Various kinds of commands here and the execution order of these will be described later.

A submission data holding program 406 is configured to manage print target image data submitted from the orderer systems 101, 102, and 103.

A JDF analysis program 407 is a program configured to receive a JDF format file used to electronically express the form of a print product and analyze the contents thereof at the time of acceptance of the order placement request of the print product from the orderer systems 101, 102, and 103. The program is used when executing, for example, presetting of a workflow, production plan making, and the like based on preconditions such as the form, the number of copies, and the medium of the product necessary for executing production based on information included in the JDF file. In addition, the processing contents of each process of a workflow, that is, a job ticket of each process is generated based on the information.

A second reception program 408 is a program configured to execute reception processing of various kinds of commands transmitted by the first transmission program 308 shown in FIG. 3. A third reception program 409 is a program configured to receive submission data transmitted by the second transmission program 309 shown in FIG. 3. Examples of commands and data received by the second reception program 408 and the third reception program 409 will be described later.

A third transmission program 410 is a program configured to transmit the result of reception by the second reception program 408 and the third reception program 409 as a response to the first reception program 310 (FIG. 3) of the orderer systems 101, 102, and 103.

Note that the operation of the order reception information management program 405 and the submission data holding program 406 processing commands and data received by the second reception program 408 and the third reception program 409 will be described later. Processing of creating response data as the processing result and transmitting it by the third transmission program 410 will also be described later.

A workflow control program 411 is a program configured to intensively manage processing and control between apparatuses connected via the network 109 in the printing company systems 104, 105, and 106 and job execution in each process. This program serves as the core of the printing company systems 104, 105, and 106. When manufacturing a product using a plurality of processes, that is, a plurality of apparatuses, the workflow control program 411 controls the execution order of the processes and execution of jobs. Also, selection and switching of apparatuses to be used, recovery production, and the like are also controlled by the workflow control program 411. Processing of giving instructions to an operator working in the printing company systems 104, 105, and 106 is also executed by the workflow control program 411. Processing of acceptability judgement for submission processing to be described later is also executed by the workflow control program 411.

The workflow control program 411 defines processes necessary for producing the requested product based on the order placement contents held and managed by the JDF analysis program, the submission data received by the third reception program 409, and the like. The order placement contents held and managed by the JDF analysis program are the contents of order placement information that is sent when the printing company systems 104, 105, and 106 receive an order from the orderer systems 101, 102, and 103. The workflow control program 411 then generates and maintains/manages jobs in the workflow. When the jobs in the workflow are executed in each process, the product desired by the orderer is produced stepwise, and a final product is consequently obtained. The workflow control program 411 executes a workflow control method, and is also called a workflow control system.

A prepress program 412 is a program configured to execute a preprocessing process of printing such as imposition, image processing, and data format conversion for the submission data received by the third reception program 409 and managed by the submission data holding program 406. The prepress program 412 is executed under the control of the workflow control program 411.

A production management program 413 makes a production plan based on the contents of commands received by the order reception information management program 405 and the second reception program 408 or the submission data received by the third reception program 409. Together with the workflow control program 411, the production management program 413 also instructs execution of jobs in each process in the workflow based on the production plan.

Figure 5A:
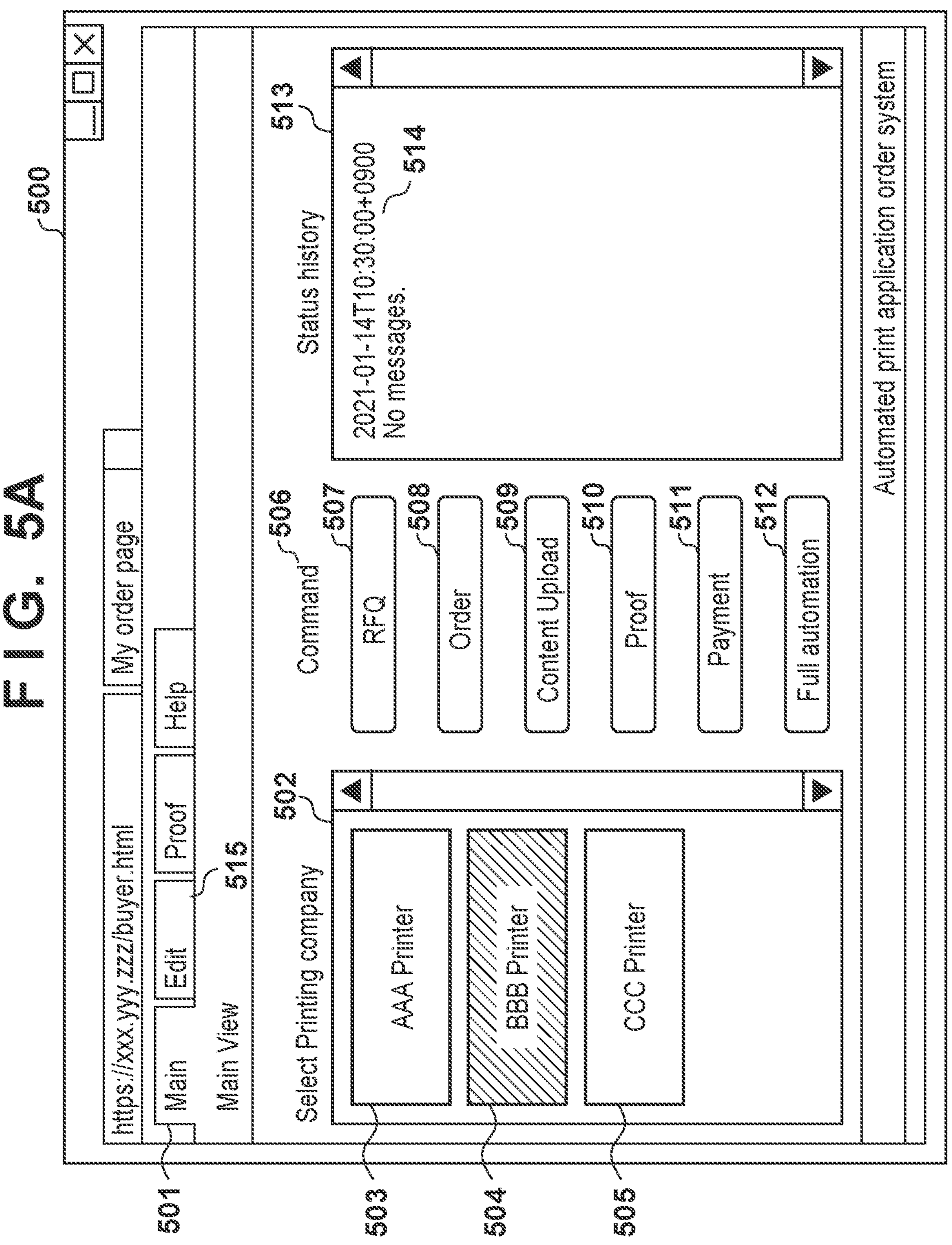

Example of Operation Screen of Order Placement Information Management Program in Orderer System FIGS. 5A and 5B show an example of operation screens displayed by the order placement information management program 305 shown in FIG. 3, which is executed in the information processing apparatus 107 in the orderer systems 101, 102, and 103.

FIG. 5A shows a state in which an order setting main tab 501 of a main screen 500 of the order placement information management program 305 according to this embodiment is selected. In the example shown in FIG. 5A, a printing company selection portion 502 is presented, and a first printing company 503, a second printing company 504, and a third printing company 505 are displayed. The orderer can select a printing company that should execute order placement processing from desired printing companies. The order placement information management program 305 according to this embodiment is also configured to perform, on a printing company management screen (not shown), management to add or delete a printing company to which an order can be placed. The example in FIG. 5A shows a state in which the second printing company 504 is selected as the order placement destination.

A command selection portion 506 is provided with a plurality of command selection portions that transmit various kinds of processing associated with order placement/order reception of a print product from the orderer systems 101, 102, and 103 to the printing company systems 104, 105, and 106.

An estimate request command issuance portion 507 is an operation portion configured to instruct transmission of an estimate request command concerning cost needed for product creation to the printing company selected in the printing company selection portion 502. When the estimate request command issuance portion 507 is pressed (touched), the screen transitions to a screen (not shown) configured to input various kinds of information necessary for the estimate request, and the orderer performs input processing of information necessary for issuance of the estimate request command using the screen.

The order placement request command issuance portion 508 is an operation portion configured to transmit, to the printing company, an order placement command including the estimate information acquired by selecting the estimate request command issuance portion 507 and setting information of the form of a product edited by a JDF editing portion 520 to be described later. The printing company of the transmission destination is the printing company selected in the printing company selection portion 502. When the order placement request command issuance portion 508 is selected, a command including the order placement contents is transmitted to the second printing company 504 that is the selected printing company.

A submission data transmission portion 509 is an operation portion used to instruct the orderer systems 101, 102, and 103 to transmit submission data as the print target to the printing company systems 104, 105, and 106. The system according to this embodiment is configured selectively execute submission processing by the submission data transmission portion 509 as processing independent of the order placement processing after order placement processing by the order placement request command issuance portion 508. However, a configuration capable of performing submission processing at the same time as the order placement processing can also be employed, as a matter of course.

However, in the practice associated with order placement/order reception in the print product manufacturing industry, order placement processing and submission processing of data as the print target are not necessarily performed at the same time. Frequently, order placement processing is executed first, the printing company executes various kinds of processing for production in advance, and the orderer executes production and updating of submission data after the order placement processing meanwhile and sends the submission data to the printing company after order placement.

Also, not all submission data are necessarily produced at once and submitted to the printing company. In some cases, the contents of submission data are submitted sequentially from completed portions, and submission processing is completed when all submission data are submitted.

Furthermore, the degree of completion of submission data is not necessary high at the first time of document submission. In the print product order placement/order reception work, submission data provided for the production use is often completed by performing calibration processing, preflight processing, and the like a plurality of times.

As another example, there is also a case in which unplanned contents are added by, for example, replacing once submitted data due to some reason.

That is, in the practice of the printing industry, order placement processing and submission processing are often performed at different timings due to the above-described reasons. In the first embodiment of the present invention, the order placement request command issuance portion 508 and the submission data transmission portion 509 are provided as independent operation portions, as shown in FIG. 5A, to flexibly cope with such a situation.

A proof request portion 510 is an operation portion that instructs transmission of a command for requesting test printing based on the manufacturing conditions and the submission data, which are necessary for production of the print product and transmitted by the order placement request command issuance portion 508 and the submission data transmission portion 509. This command is transmitted from the orderer systems 101, 102, and 103 to the printing company systems 104, 105, and 106. However, the present invention does not limit the actual means and form of proof because whether the test printing includes print processing of submission data on a physical medium or is achieved by image confirmation using an electronic means depends on the requirements of the system or the customer. In addition, since a case in which the orderer himself/herself executes proof processing is also assumed, the proof request portion 510 is not indispensable in that case.

A payment execution portion 511 is an operation portion configured to instruct transmission of a command for executing payment processing for the product produced by the printing company systems 104, 105, and 106. At that time, the system according to this embodiment assumes that a money amount is calculated mainly based on money amount information acquired as the execution result of the estimate request command issuance portion 507, and settlement processing is performed mainly by an electronic means.

A status confirmation portion 513 is a region configured to display the contents of commands from the orderer system to the printing company system, which are executed in the command selection portion 506, and responses as the results of command execution by the printing company system that has received the commands. In this embodiment, the system is also configured to display, by this portion, commands executed by the printing company systems 104, 105, and 106 to the orderer systems 101, 102, and 103, notification information, and the like.

In the example shown in FIG. 5A, the orderer systems 101, 102, and 103 only select the second printing company 504, and any command is not executed yet by the command selection portion 506. Hence, a status 1 514 shows that any processing is not performed at 10:30, Jan. 14, 2021.

Details of a JDF editing screen 520 shown in FIG. 5B will be described below. The JDF editing screen 520 is a screen used to edit, by the JDF format, setting information including the form of a product transmitted by selection of the order placement request command issuance portion 508 as the JDF format. A detailed example of data of the JDF format by the information included in FIG. 5B will be described later.

Figure 6:
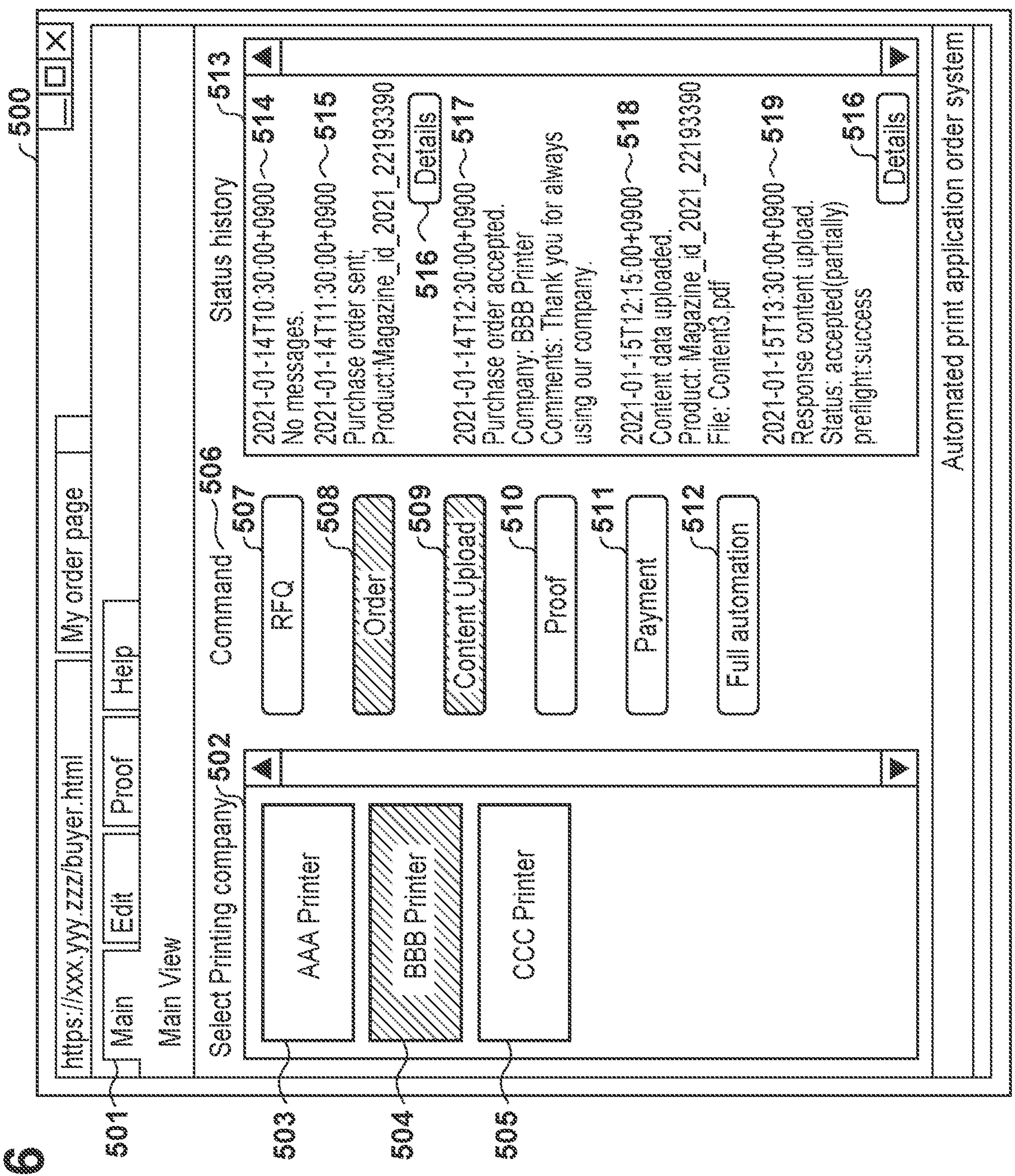
FIG. 6 is a second explanatory view of the operation procedure of the first information processing apparatus according to the first embodiment.

FIG. 6 is a view for explaining an example of the transmission/reception history of instruction commands sent by the operation portions of the command selection portion 506 from the orderer systems 101, 102, and 103 to the second printing company 504 and responses from the second printing company 504 to the commands from the state shown in FIGS. 5A and 5B. Details of the behavior of the system according to this embodiment will be described below based on the execution history of commands presented by the status confirmation portion 513. The behavior of the system to be described here includes the contents of commands in product order placement/order reception executed by the orderer systems 101, 102, and 103 for the printing company systems 104, 105, and 106.

FIG. 6 shows, in a status 2 515, that the order placement request command issuance portion 508 transmitted an order placement command to the second printing company 504 at 11:30, Jan. 14, 2021. The instruction of the order placement command is done by the order placement request command issuance portion 508, as already described. As described with reference to FIGS. 5A and 5B, JDF data created and edited by the JDF editing portion 520 at this time is also transmitted simultaneously.

A status 3 517 shows that the order placement command was accepted at 12:30, Jan. 14, 2021 as a response to the order placement command transmitted from the orderer systems 101, 102, and 103 to the second printing company 504 in the status 2 515.

A status 4 518 shows that in response to the order placement accepted by the second printing company 504 in the status 3 517, the orderer system executed a submission data transmission command to the second printing company 504 at 12:15, Jan. 15, 2021. The submission data transmission command is transmitted by the submission data transmission portion 509. FIG. 6 shows that a submission data file "Content3.pdf" was submitted.

A status 5 519 shows that the submission data transmission command in the status 4 518 was accepted at 13:30, Jan. 15, 2021 as a response from the orderer systems 101, 102, and 103 to the second printing company 504.

A detailed information display instruction portion 516 is selected to display more detailed information concerning each status as needed.

An example of commands and responses concerning the print product order placement/order reception work and, more particularly, order placement and submission processing between the orderer systems 101, 102, and 103 and the printing company systems 104, 105, and 106 has been described above.

Example of Operation Screen of Order Reception Information Management Program in Printing Company System FIGS. 18A to 20 show an example of operation screens displayed by the order reception information management program 405 shown in FIG. 4, which is executed in the information processing apparatus 108 in the printing company systems 104, 105, and 106.

Figure 18A:
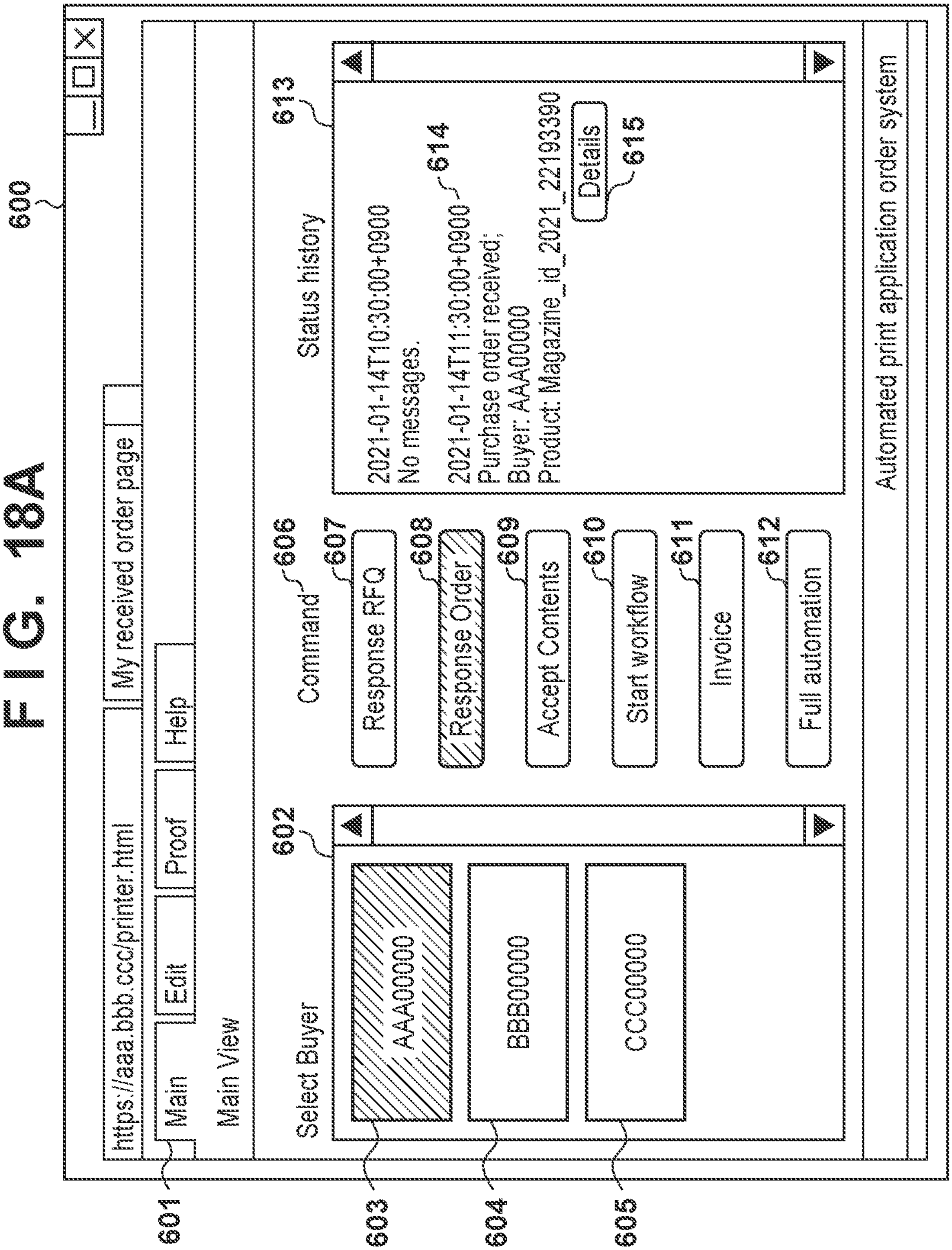
FIGS. 18A and 18B are explanatory views of the operation procedure of the second information processing apparatus according to the first embodiment.

FIG. 18A shows a state in which an order reception processing main tab 601 of a main screen 600 of the order reception information management program 405 according to this embodiment is selected. In the example shown in FIG. 18A, an orderer selection portion 602 is presented, and a first orderer 603, a second orderer 604, and a third orderer 605 are displayed. The operation portion of the order reception information management program 405 according to this embodiment is configured such that the printing company can individually identify and manage orders received from a plurality of orderers by this method. It is possible to select one of the plurality of orderers and perform necessary processing in accordance with the contents of a command that is a request of the orderer. The order reception information management program 405 according to this embodiment is also configured to perform, on an orderer management screen (not shown), management to add or delete an orderer whose order can be received. The example in FIG. 18A shows a state in which selection is done to process a request from the first orderer 603.

A command selection portion 606 is provided with a plurality of command selection portions that transmit various kinds of processing of the printing company associated with order placement/order reception of a print product from the printing company systems 104, 105, and 106 to the orderer systems 101, 102, and 103. The main application purpose is to select responses to various kinds of request commands to the printing company, which are instructed by the command selection portion 506 in the orderer systems 101, 102, and 103 shown in FIGS. 5A and 5B.

An estimate request response command issuance portion 607 is an operation portion configured to transmit, to the orderer systems 101, 102, and 103, a response to the estimate request command from the orderer systems 101, 102, and 103 by the estimate request command issuance portion 507. This response includes an estimate for the designated estimate target, for example, presentation of a money amount and a delivery date.

An order placement request response issuance portion 608 is an operation portion configured to transmit, to the orderer systems 101, 102, and 103, a response to the order placement command from the orderer systems 101, 102, and 103 by the order placement request command issuance portion 508 shown in FIGS. 5A and 5B, that is, whether the order can be accepted.

A submission data acceptance portion 609 is an operation portion configured to transmit, to the orderer systems 101, 102, and 103, a response to the data submission request command from the orderer systems 101, 102, and 103 by the submission data transmission portion 509 shown in FIGS. 5A and 5B. This response includes acceptability of submission data.

A workflow execution instruction portion 610 is an operation portion configured to give instructions from the printing company systems 104, 105, and 106 to the workflow control program 411 in the print product order placement/order reception work to the orderer systems 101, 102, and 103. The instructions include an instruction of production when conditions necessary for production are met. As described above, upon receiving an order, the printing company systems 104, 105, and 106 start processing of a workflow for preparation. At this time, the workflow execution instruction portion 610 is used. The configuration of a workflow as the execution target of the workflow control program 411 shown in FIG. 4 and its operation will be described later.

A payment request execution portion 611 is an instruction portion of a command to be selected and executed when the printing company systems 104, 105, and 106 charge the client for the cost of production of the print product requested by the orderer systems 101, 102, and 103. The payment request execution portion 611 is provided such that it is executed before the payment execution portion 511 shown in FIGS. 5A and 5B or execution is instructed about the same time.

A status confirmation portion 613 is a region configured to display the contents of commands received, in the command selection portion 606, from the corresponding orderer systems 101, 102, and 103 or responses as the results of execution of the commands by the printing company systems 104, 105, and 106. In this embodiment, the system is also configured to display, by the status confirmation portion 613, commands executed by the printing company systems 104, 105, and 106 to the orderer systems 101, 102, and 103, notification information, and the like.

In the example shown in FIG. 18A, a status 1 614 shows that an order placement command to the selected printing company that is the second printing company 504 was received by the order placement request command issuance portion 508 in the status 2 515 shown in FIG. 6, that is, at 11:30, Jan. 14, 2021.

Figure 18B:
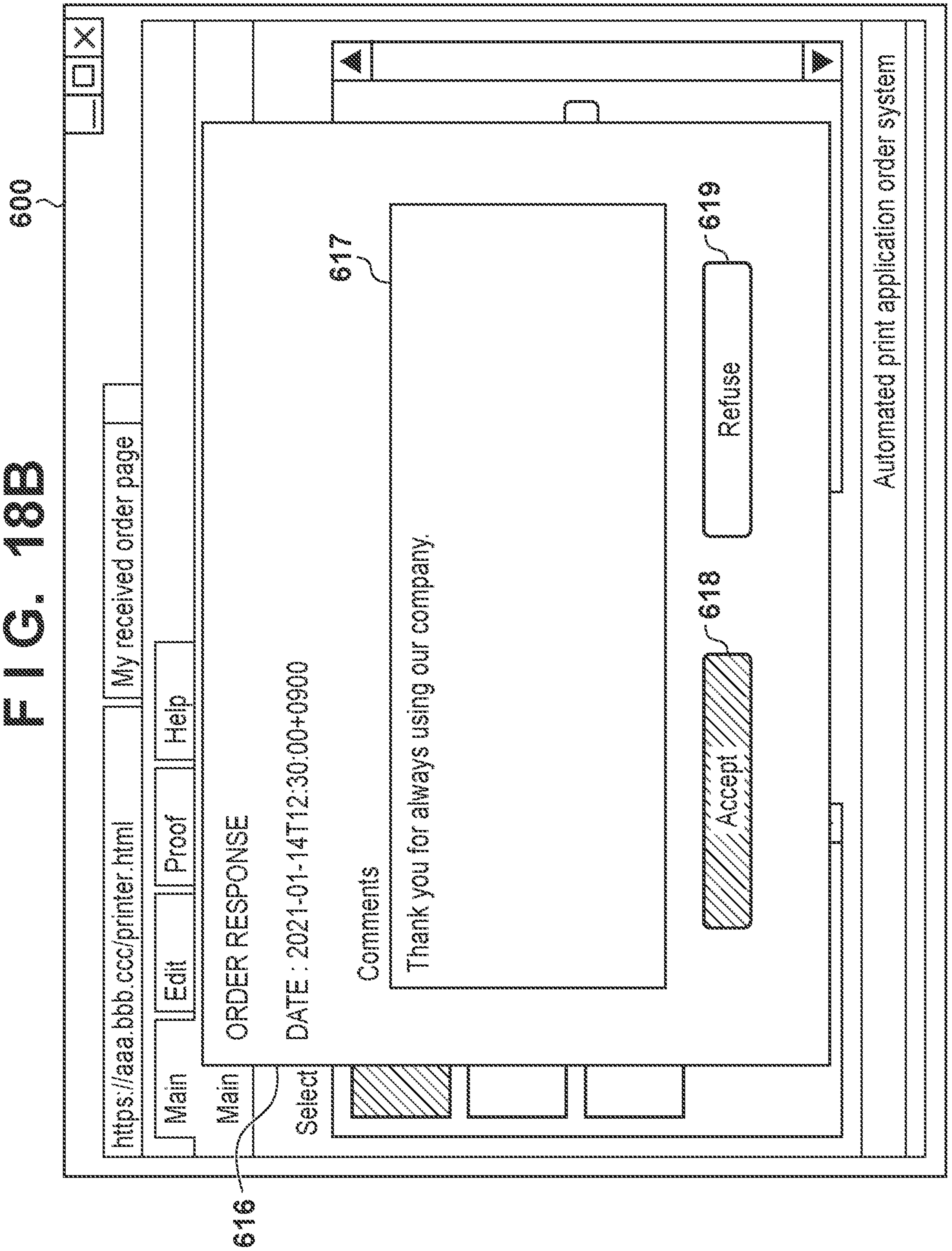

FIG. 18B shows an example of an operation portion displayed when the order placement request response issuance portion 608 is selected. The system is configured to select the acceptance permission portion 618 if an order placement request command is accepted from the orderer systems 101, 102, and 103, or select the acceptance refusal portion 619 if not. FIG. 18B shows an example in which an additional information input portion 617 configured to transmit not a response simply representing acceptance or refusal but also a reason to the orderer systems 101, 102, and 103 that has requested the order placement is provided. Note that information input by the additional information input portion 617 is reflected on the status 3 517 in FIG. 6. However, the additional information input portion 617 according to the example of in this embodiment enables input by the discretion of the person in charge of the operator of the printing company systems 104, 105, and 106. However, the present invention is not limited to this, and it is also possible to employ a form in which similar information is automatically generated or selected and saved based on various conditions such as the contents of commands exchanged between the orderer systems 101, 102, and 103 and the printing company systems 104, 105, and 106 and the state of order placement/order reception.

Figure 19A:
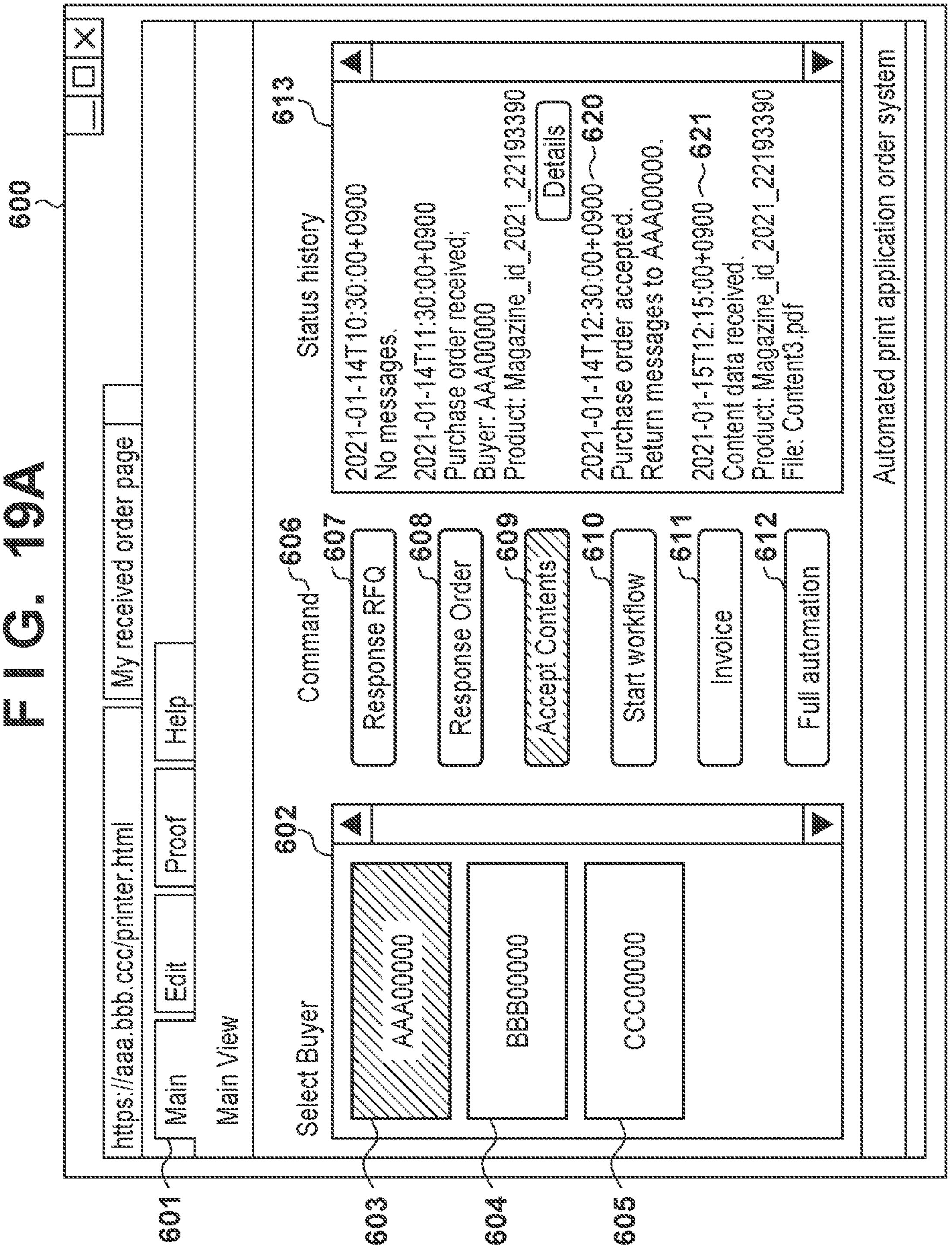
FIGS. 19A and 19B are second explanatory views of the operation procedure of the second information processing apparatus according to the first embodiment.

FIG. 19A shows an example of a state in which the operation further progresses from the state shown in FIG. 18A. FIG. 19A shows a status 2 620 indicating that, as the result of selection of the acceptance permission portion 618 in FIG. 18B, the printing company systems 104, 105, and 106 transmitted a response to the orderer at 12:30, Jan. 14, 2021.

Also, the status confirmation portion 613 shown in FIG. 19A shows that the second printing company 504 as the selected printing company received the content data submission processing request, which was transmitted in the status 4 518 shown in FIG. 6, as a status 3 621 at 12:15, Jan. 15, 2021.

Figure 19B:
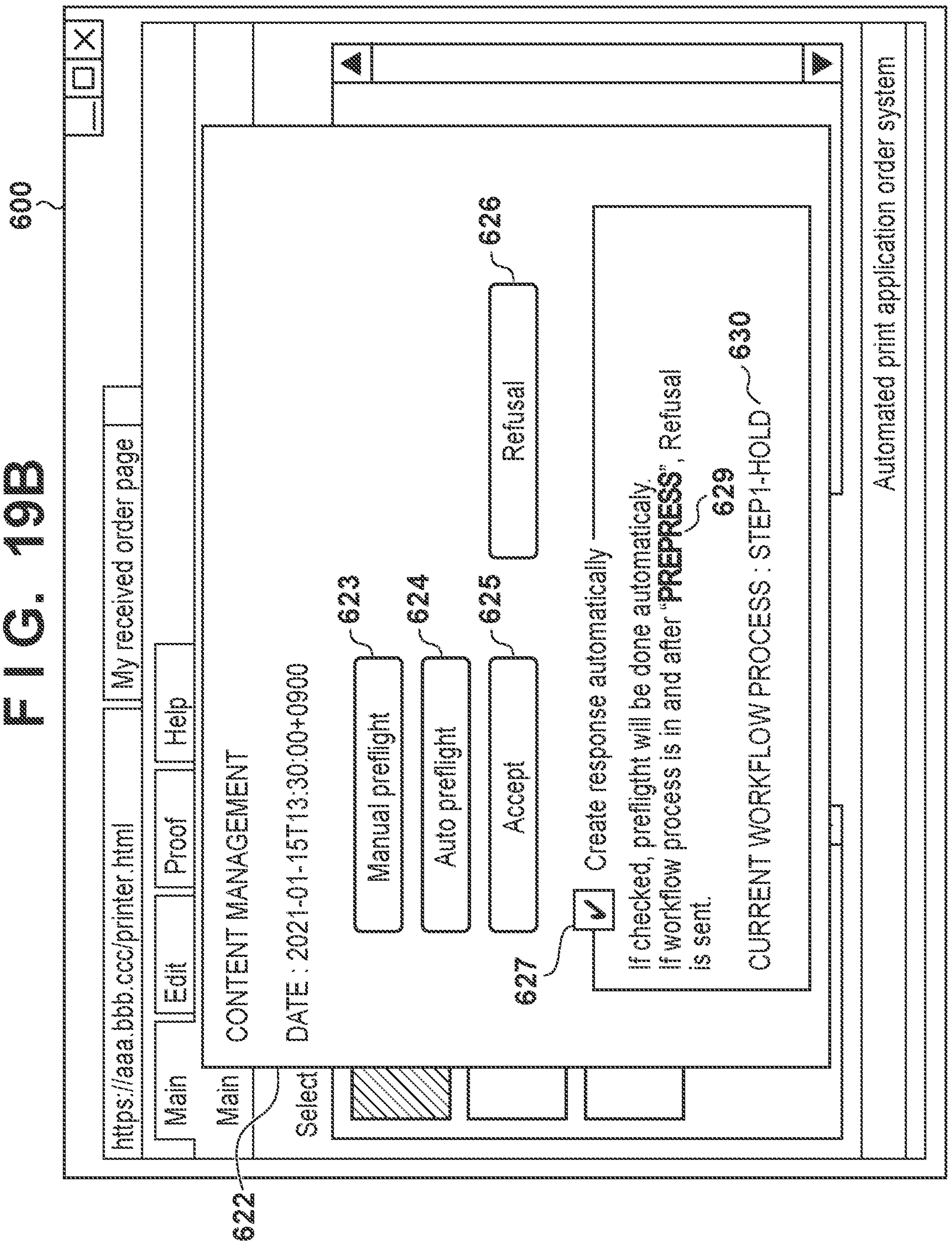

Note that FIG. 19B also shows an example of a control portion 622 displayed after the submission data acceptance portion 609 is selected in the status 4 518 shown in FIG. 6.

A manual preflight execution portion 623 is an operation portion selected by the operator in the printing company, who is the user of the system, to manually execute verification of submitted data. If this portion is selected, the process advances to manual preflight processing (not shown), and the operator executes preflight processing by a manual work including visual inspection for the submission data. The preflight processing by manual work can cope with the business format of the print product creation work by the conventional non-digitized practice, such as manual correction of submission data using so-called red pen correction.

An automatic preflight execution portion 624 is a selection portion to be selected to cause the printing company system to automatically execute verification of submitted data. If this portion is selected, automatic preflight processing (not shown) is activated, and adequacy of submitted data is verified by a program. In the automatic preflight processing, for example, consistency of data is mainly verified. More specifically, it is verified whether font data is not embedded in submission data. In this case, font data different from the font that the person who has submitted data, that is, the orderer wants to use in the product may be applied, and as a result, a printing result different from the request may be obtained. To prevent this, such inspection is conducted.

A document submission acceptance portion 625 is a selection portion to be selected when the result of preflight processing executed by the manual preflight execution portion 623 or the automatic preflight execution portion 624 is satisfactory. More specifically, the document submission acceptance portion 625 is used to transmit information as shown by the status 5 519 in FIG. 6 from the printing company systems 104, 105, and 106 to the orderer systems 101, 102, and 103.

On the other hand, a document submission non-acceptance portion 626 is a selection portion to be selected when the result of preflight processing by the manual preflight execution portion 623 or the automatic preflight execution portion 624 is not satisfactory.

A submission data automatic response portion 627 is an operation portion to be used to more automatically execute a response of operation portion from the orderer systems 101, 102, and 103 to the printing company systems 104, 105, and 106, including the execution results by the above-described units. If this portion is selected, the response to submission processing performed by the orderer systems 101, 102, and 103 for the printing company systems 104, 105, and 106, that is, reception of submission data by the submission data transmission portion 509 is automatically sent based on the result of discriminating conditions.

When the submission data automatic response portion 627 is selected, processes corresponding to the manual preflight execution portion 623, the automatic preflight execution portion 624, the document submission acceptance portion 625, the document submission non-acceptance portion 626, and the like are automatically performed in accordance with conditions. That is, the same processes as those executed when these operation portions are selected are performed in response to reception of submission data. This allows the printing company systems 104, 105, and 106 to discriminate optimum response processing contents and transmit response information while considering various kinds of discrimination processing for submission processing and the workflow executed by the printing company systems 104 to 106 to manufacture a product.

Details of contents of automated response processing for submission processing, which are achieved by the submission data automatic response portion 627 according to this embodiment, will be described below.

First, if the submission data automatic response portion 627 is selected, preflight processing for submitted data is automatically executed. That is, the system is configured to obtain the same effect as in a state in which the automatic preflight execution portion 624 is selected.

Second, the system is configured to discriminate acceptability of submission processing based on the execution status of the job in the workflow built and processed in the printing company systems 104, 105, and 106 concerning the ordered product. The execution status of the job includes information concerning a process of the workflow under processing. More specifically, when a document submission request is received from the orderer systems 101, 102, and 103, it is discriminated whether, of the processes of the workflow in the printing company systems 104, 105, and 106, a specific process or a process after the specific process is being performed. The reason why acceptability of document submission is judged when the specific process or a process after the specific process is being performed will be described later.

In the example shown in FIG. 19B, if document submission is done after execution of a prepress process 629 or a process after that in the system according to this embodiment, a setting for controlling the system not to accept the submission processing is selected and instructed. Also, when the operator of the printing company systems 104, 105, and 106 is performing the operation in the state shown in FIG. 19B, the process that is currently being processed is a first holding process 630. The first holding process is a step processed before the prepress process 629, as will be described later, but is neither the prepress process 629 nor a process after that. Hence, if document submission is done under the conditions shown in FIG. 19B, the system according to this embodiment is controlled to accept the submission processing.

In this way, in accordance with the progress of workflow processing associated with manufacturing of the ordered print product, the system according to this embodiment can control to automatically discriminate acceptability of submission processing performed separately from order placement.

Figure 20:
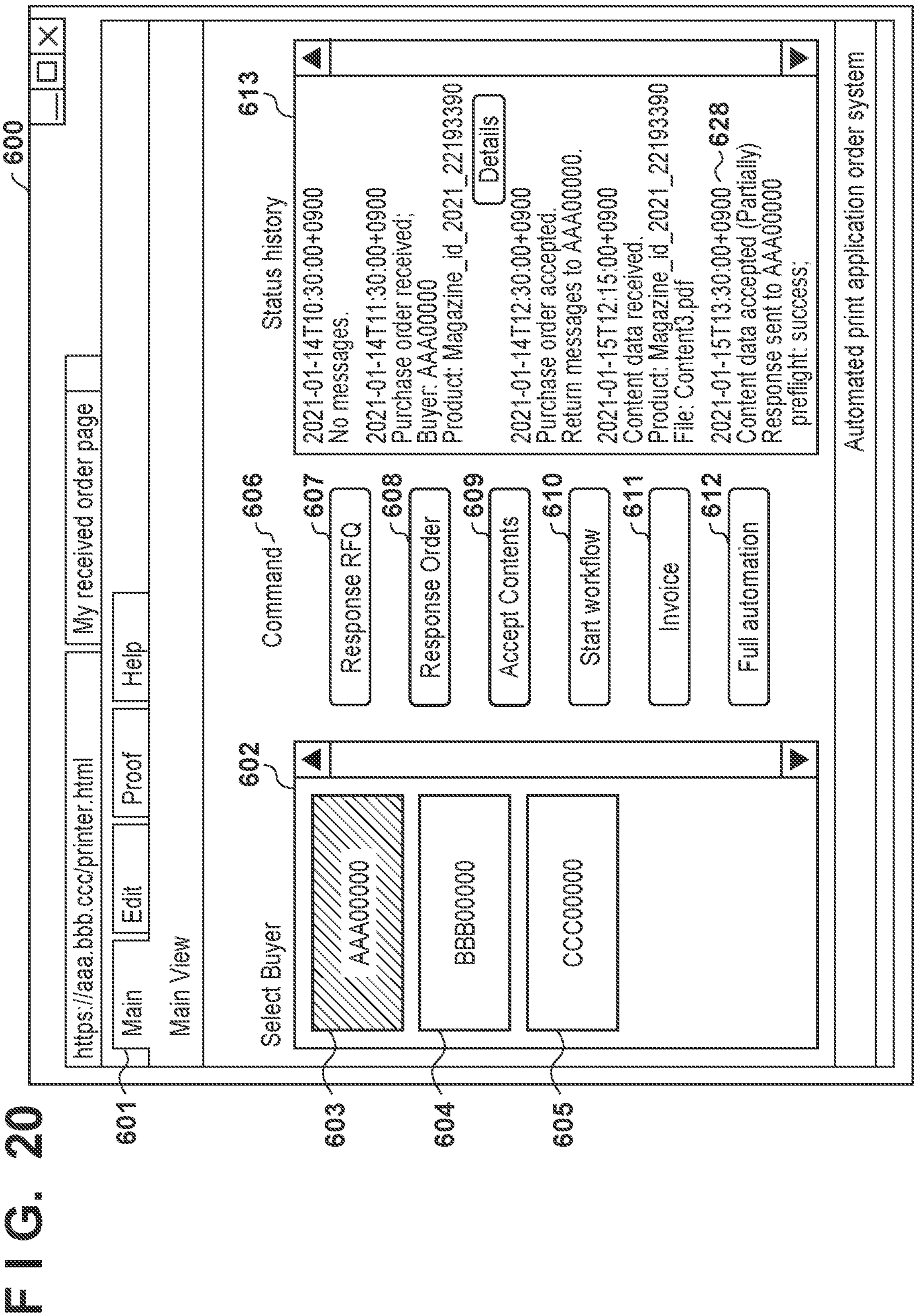
FIG. 20 is a third explanatory view of the operation procedure of the second information processing apparatus according to the first embodiment.

FIG. 20 shows an example of the result of the operations of the operation portions described with reference to FIGS. 19A and 19B. A status 4 628 shows that content data submitted from the orderer systems 101, 102, and 103 was accepted on the printing company system side. On the other hand, the same submission status is displayed in the orderer systems 101, 102, and 103 as well, like the status 4 518 in FIG. 6.

As shown in the drawings of this embodiment, since the screens show the processes of order placement and order reception, which correspond to each other, the configurations of the operation portions shown in FIGS. 5A, 5B, and 6 and those shown in FIGS. 18A, 18B, 19A, 19B, and 20 make pairs necessarily. In addition, as described with reference to FIG. 1, when commonality of the electronic format to be mutually transmitted/received is attained to achieve efficiency and digitization in the order placement/order reception work, the order placement/order reception work based on the common system can be established between order placement/order reception companies. However, the configuration method of the operation portions is merely an element of digitization. This embodiment shows an example in which sophisticated commonality of the system is achieved based on common specifications, and the corresponding operation portions need not always be provided.

Figure 7A:
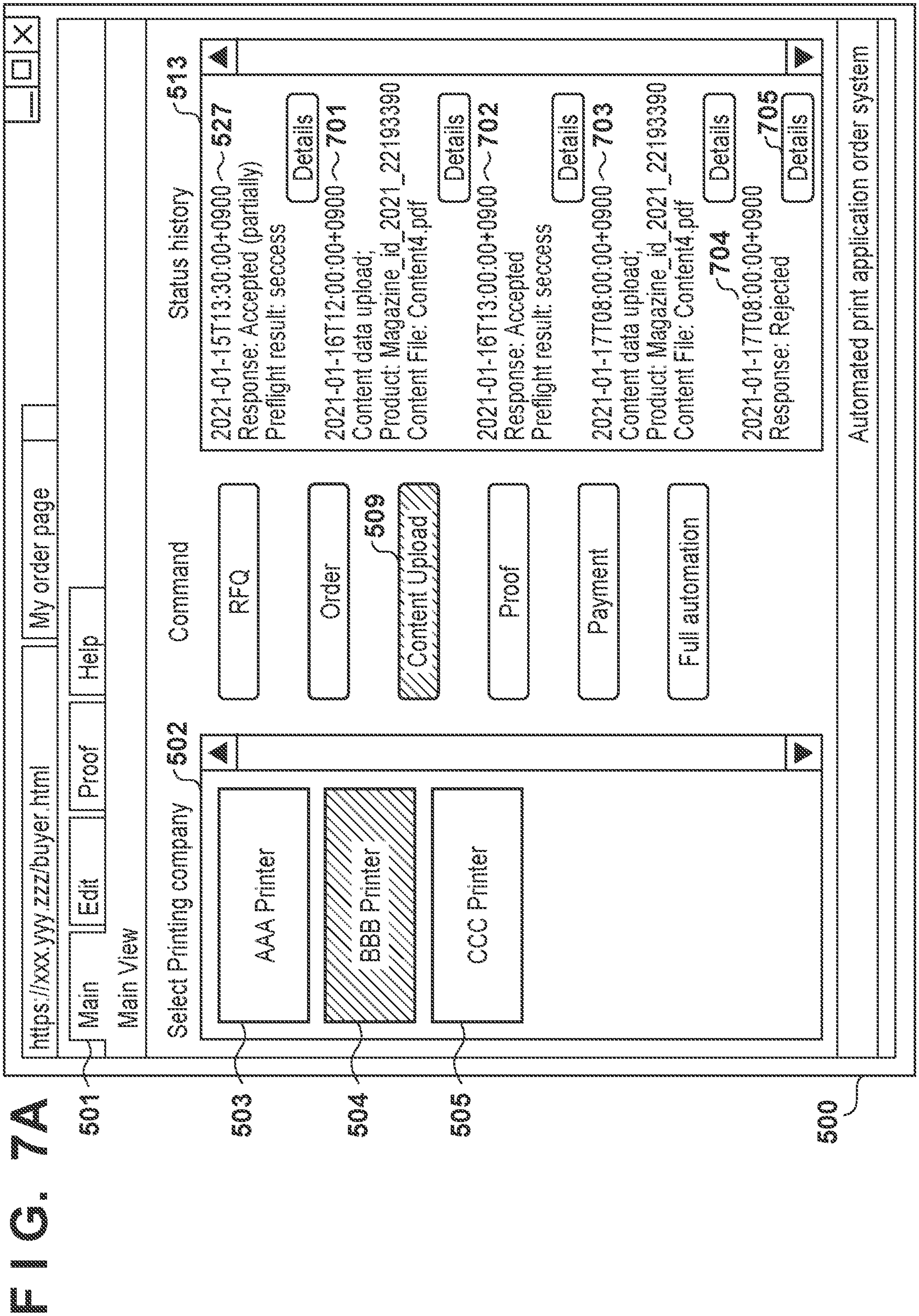
FIGS. 7A and 7B are views showing an example of an additional submission data operation in the second information processing apparatus according to the first embodiment.
Figure 7B:
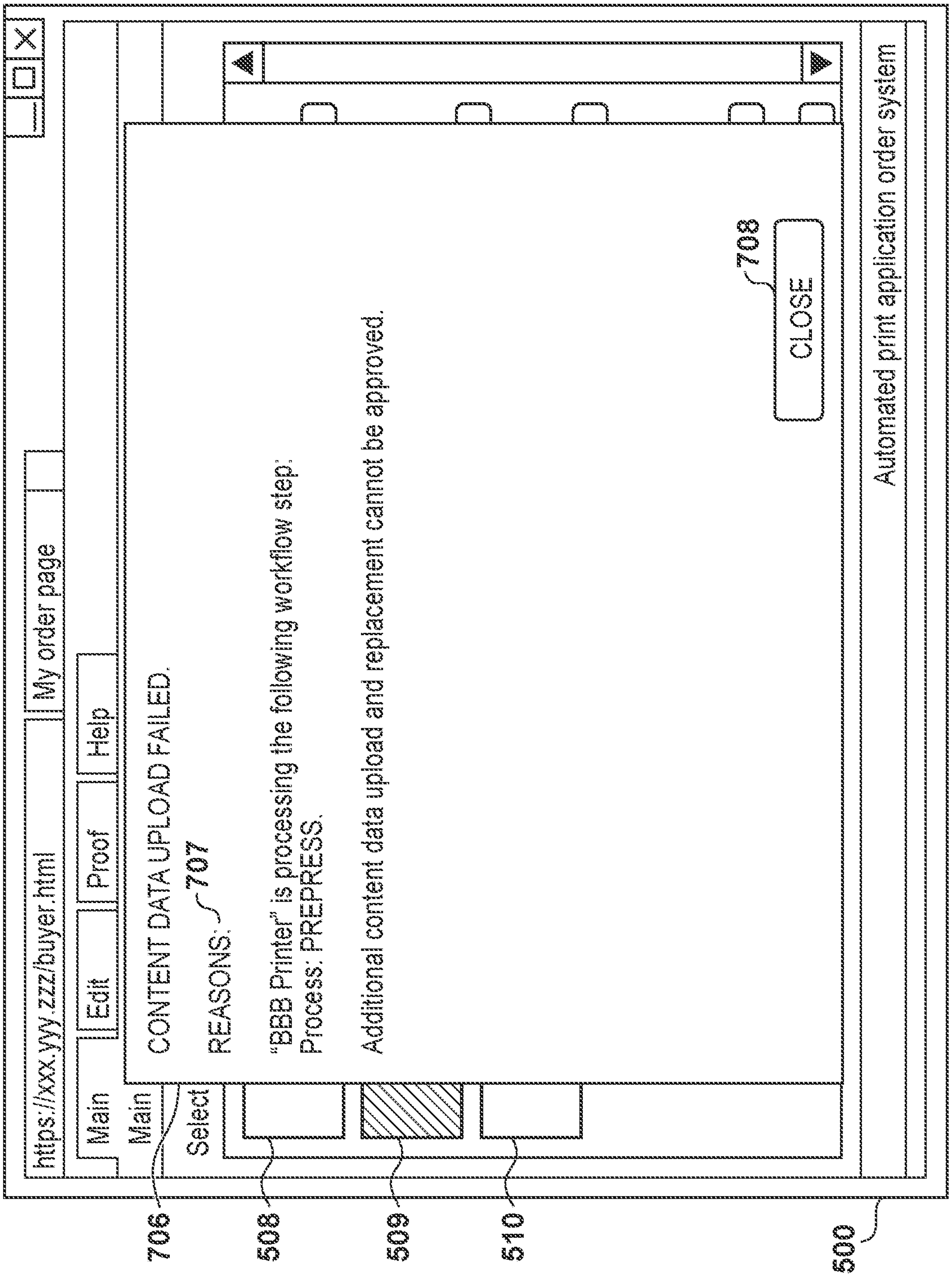

FIGS. 7A and 7B are views for explaining an example in which, from the operation described with reference to FIG. 6, the orderer systems 101, 102, and 103 further execute submission processing for the selected printing company systems 104, 105, and 106.

As shown in FIG. 7A, a status 1 701 displayed in the status confirmation portion 513 indicates an example in which the submission data transmission portion 509 submitted another data at 12:00, Jan. 16, 2021. That is, as shown in FIG. 7A, a submission data file “Content4.pdf” was submitted. Since the submission data “Content4.pdf” has not been submitted previously, this processing corresponds to submission processing of new submission data, that is, additional data.

In the example shown in FIG. 7A, a status 2 702 shows that the additional document submission request received in the status 1 701 was accepted by the second printing company 504. Also, a status 3 703 shows that “Content4.pdf” that is the same submission data as additionally submitted in the status 1 701 was submitted at 08:00, Jan. 17, 2021. This means replacement document submission for replacing the previously submitted data.

However, a status 4 704 shows that the replacement document submission request from the orderer systems 101, 102, and 103 to the second printing company 504 shown in the status 3 703 was rejected.

As shown in FIGS. 5A and 5B, in order placement/order reception of print product manufacturing, it is known that order placement processing and submission processing are separately performed as a practice. In addition, replacement document submission for replacing already submitted data is also widely performed due to various kinds of reasons shown in FIGS. 5A and 5B. On the other hand, the printing company generally has a time restriction to achieve contracted production in delivery time. Also, a production plan is made and processed by the workflow control program 411 and the production management program 413 in a workflow system that is built in the printing company to efficiently process a plurality of production requests from a plurality of orderers.

That is, the orderer wants that submission data replacement on the circumstances of the orderer should be accepted as late as possible even after order placement. On the other hand, in the printing company, it is important, from the viewpoint of productivity, that submission data is submitted quickly as a final draft after order placement and processed under the control of the production management program 413 and the workflow control program 411 without delay.

In general, a workflow system is formed by various processes depending on the method. In an actual system, there exists a case in which after completion of a specific process of a workflow that is generated in a printing company system upon receiving order placement, a processing request of replacement or addition of submission data associated with the job cannot be permitted due to circumstances of production management. More specifically, this corresponds to a situation in which the process processed by the workflow is the prepress process 629 or a process after that, as shown in FIG. 19B.

Hence, to implement digitization of the order placement/order reception work for print products and a practical automatic system based on common specifications, which allow the practice of the industry, document submission acceptability judgement processing advantageous for both the orderer and the printing company is required. Advantages for both include an allowable delay of the time of additional document submission, correction, or replacement for the orderer, and an efficient work free from any retracements for the printing company. If document data reflected on a product is called a final draft, the time of additional document submission, correction, or replacement can also be called the time of submission of the final draft. The embodiment of the present invention has been made in order to provide a realistic solution to the problem. Details of the specific process of the workflow and the reason of adequacy of performing document submission acceptability judgement processing during the process will be described later.

FIG. 7B shows an example of a display state when a detail display instruction portion 705 in FIG. 7A is selected. That is, this is displayed to refer to information presentation of the detailed reason why the replacement document submission request of "Content4.pdf" was not accepted in the status 4 704 in FIG. 7A.

A detailed reason information presentation portion 707 shows a reason, from the second printing company 504 that received the replacement document submission processing request, why the replacement document submission processing request could not be accepted. That is, in the second printing company 504, that the process of the workflow in the printing company concerning the manufacturing request of the print product ordered and submitted from the orderer systems 101, 102, and 103 has progressed up to the prepress process 629 is presented as the reason. This is because replacement document submission for submission data under prepress processing cannot be permitted (is not permitted).

Sequence Example of Commands/Responses

Figure 8:
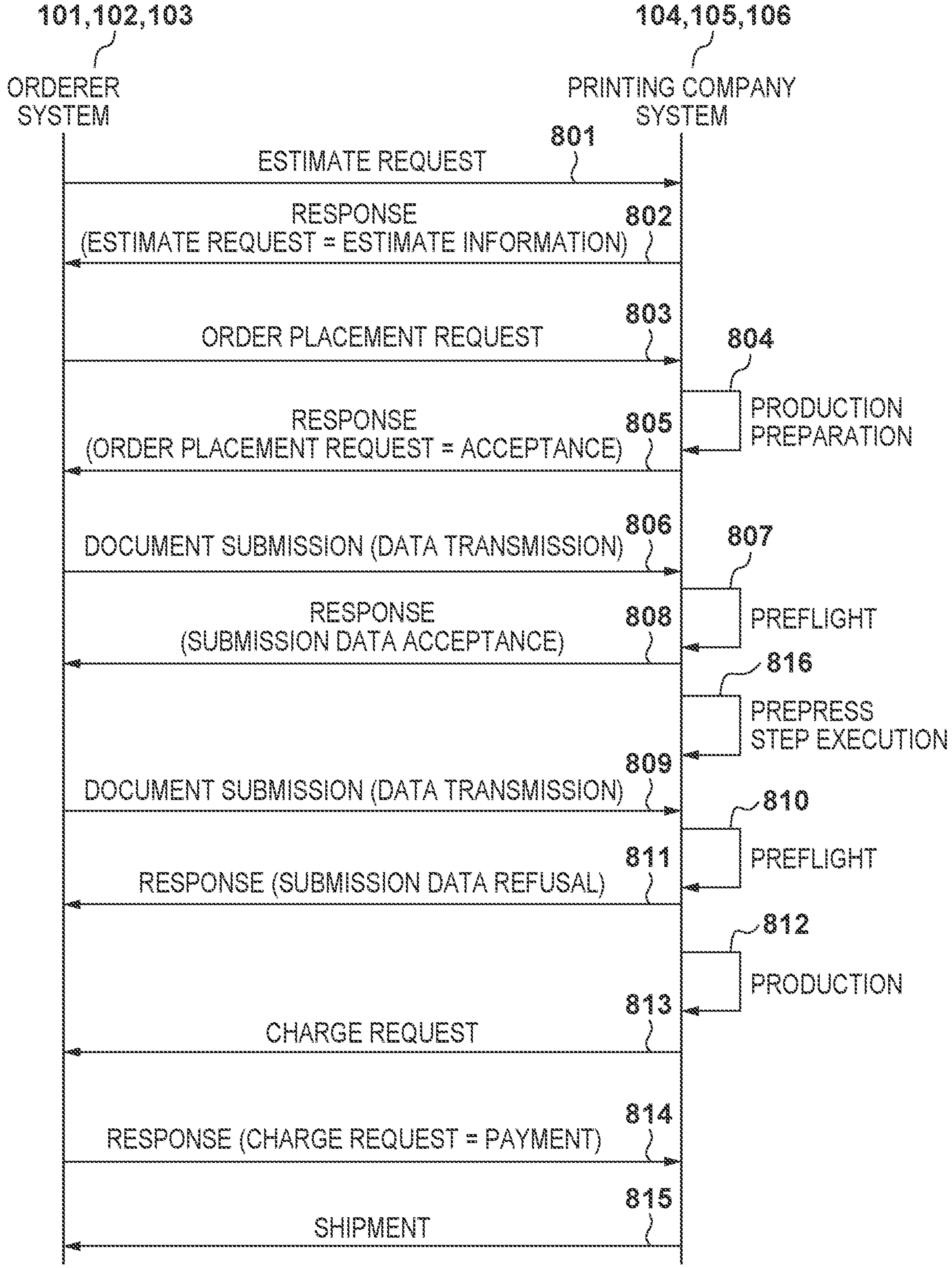
FIG. 8 is a sequence chart of information exchanged between the first and second information processing apparatuses according to the first embodiment.

FIG. 8 explains the sequence of commands and responses exchanged between the orderer systems 101, 102, and 103 and the printing company systems 104, 105, and 106, as shown in FIGS. 5A and 5B, and FIGS. 18A, 18B, 19A, 19B, and 20.

First, an estimate request command 801 is transmitted from the orderer systems 101, 102, and 103 to the printing company systems 104, 105, and 106. Transmission of this command is instructed by the estimate request command issuance portion 507, as described with reference to FIG. 5A.

As a response to the estimate request command 801, the printing company systems 104, 105, and 106 transmit the estimate information 802 to the orderer systems 101, 102, and 103. Transmission of the response 802 is instructed by the estimate request response command issuance portion 607 shown in FIG. 18A.

Based on the estimate information included in the response 802, the orderer systems 101, 102, and 103 transmit an order placement request command 803 to the printing company systems 104, 105, and 106. The order placement request command 803 is instructed by the order placement request command issuance portion 508 described with reference to FIG. 5A.

Upon receiving the order placement request command 803, the printing company systems 104, 105, and 106 accept the order placement contents and prepare for the production system (804). More specifically, processing necessary for setup of a workflow to be described later is executed.

Upon accepting the order placement request command 803, the printing company systems 104, 105, and 106 transmit a response 805 to the orderer systems 101, 102, and 103. Transmission of the response 805 is instructed by the order placement request response issuance portion 608 shown in FIG. 18A.

From then on, the orderer systems 101, 102, and 103 produce submission data that is the print request target, and when preparation is completed, transmit a document submission command 806 to the printing company systems 104, 105, and 106 and execute submission processing. The document submission command 806 is instructed by the submission data transmission portion 509 described with reference to FIG. 5A. Note that the order and the submission data are preferably linked with each other by, for example, adding an order ID to the order placement and making the orderer system to submit data with the given order ID. For example, the printing company system that has received the order placement request command 803 adds an order ID to the order placement and returns the response 805 to the orderer system. The orderer system adds the order ID to a command associated with the order, thereby associating the order and the command or data associated with the command.

Upon receiving the submission data, the printing company systems 104, 105, and 106 execute preflight processing 807 for the received data, and after the end, transmit a response 808 to the orderer systems 101, 102, and 103. Transmission of the response 808 is instructed by the submission data acceptance portion 609.

Note that as shown in FIGS. 5A and 5B, to cope with the practice associated with order placement/order reception of print product manufacturing, the system according to this embodiment is configured to execute the order placement request command 803 and the document submission command 806 as separate commands.

The orderer systems 101, 102, and 103 transmit another document submission command 809 to the printing company systems 104, 105, and 106 as needed. A case in which the other document submission command 809 is necessary is considered to be a case in which the system according to this embodiment needs to cope with a request of additional document submission or replacement document submission, as described above with reference to FIGS. 7A and 7B.

However, as shown in FIG. 8, workflow processing concerning the product creation work requested by the orderer systems 101, 102, and 103 advances to a prepress process 816.

As shown in FIGS. 19A and 19B and FIGS. 7A and 7B, in the system according to this embodiment, after workflow processing concerning a certain order advances to the prepress process 629 that is a specific process, the printing company system does not accept submission data associated with the order.

Assume that the printing company systems 104, 105, and 106 accept the other document submission command 809 in this state. At this time, preflight processing 810 is executed, like the preflight processing 807. After that, a response 811 is transmitted from the printing company systems 104, 105, and 106 to the orderer systems 101, 102, and 103. The response is a notification representing that submission processing is not accepted (or is refused), as shown in FIG. 7B.

After that, based on the setting of the setup workflow, the printing company systems 104, 105, and 106 execute production 812 of a print product based on the order placement request command 803 and the document submission commands 806 and 809. Here, the setting of the workflow is set up in the preparation 804 of the production system that is started when the order placement request command 803 is received. In the example of this embodiment, this is instructed by the workflow execution instruction portion 610 in FIG. 18A.

At an appropriate timing after the end of the production 812 of the requested print product, a charge command 813 for the cost of the production is transmitted from the printing company systems 104, 105, and 106 to the orderer systems 101, 102, and 103. Transmission of this command is instructed by the payment request execution portion 611 in FIG. 18A.

Upon accepting the charge command 813, to execute corresponding payment processing, the orderer systems 101, 102, and 103 transmit a response 814 for executing payment to the printing company systems 104, 105, and 106. In the process of transmission of the response, electronic settlement processing is performed in the system according to this embodiment.

After completion of the settlement processing or at almost the same time as the settlement processing, the printing company systems 104, 105, and 106 send the manufactured print product to the orderer systems 101, 102, and 103 (815). In the system according to this embodiment, execution of the sending processing is performed by a designation portion (not shown). Note that the product is a print product and can hardly be electronically sent. Hence, in the sending process 815, the date and time of product shipment via a transport company or the like may be transmitted.

Example of Commands/Responses

FIGS. 9A-1 to 9C-2 are views for explaining examples of actual data of commands and responses transmitted/received between the orderer systems 101, 102, and 103 and the printing company systems 104, 105, and 106.

FIG. 9A-1 shows an example of data of the order placement request command 803, and FIG. 9A-2 shows an example of data of the response 805. An order placement information portion 901 includes a command character string representing that the data is an order placement request command, BusinessID for identifying a series of electronic data under transaction, and information for identifying the orderer and the printing company associated with this order placement.

An order placement content description portion 902 includes information of the name of the product, production contents such as the form of the product and the number of copies, and a medium to be used. This corresponds to information created by the setting portions shown in FIGS. 5A and 5B.

The response 805 is formed by return data to the order placement request from the orderer systems 101, 102, and 103 to the printing company systems 104, 105, and 106 based on the order placement information portion 901 and the order placement content description portion 902.

An order reception response description portion 903 includes, as the return data to the order placement request, a command character string representing that the data is a response to the order placement request command, BusinessID, and information for identifying the orderer and the printing company associated with this order placement, like the order placement information portion 901. The BusinessID is information for identifying a series of electronic data under transaction. In addition, OrderStatus (Accepted) representing that the order placement is accepted, and comment information in an arbitrary format returned from the printing company systems 104, 105, and 106 to the orderer systems 101, 102, and 103 are included.

FIG. 9B-1 shows an example of data of the document submission command 806, and FIG. 9B-2 shows an example of data of the response 808. A document submission information portion 904 includes a command character string representing that the data is a document submission command, BusinessID for identifying a series of electronic data under transaction, and information for identifying the orderer and the printing company associated with this order placement. Also, FIG. 9B-1 shows an example of UpdateMethod representing that the submission processing is additional document submission.

In a submission data designation portion 905, a file of electronic data that is the submission target is designated. That is, FIG. 9B-1 shows an example in which a file "Content3.pdf" is submitted as additional data.

The response 808 is formed by return data to the submission processing requested from the orderer systems 101, 102, and 103 to the printing company systems 104, 105, and 106 based on the document submission information portion 904 and the submission data designation portion 905.

A document submission response description portion 906 includes, as the return data to the document submission request, a command character string representing that the data is a response to the document submission command, BusinessID, and information for identifying the orderer and the printing company associated with this document submission, like the document submission information portion 904. The BusinessID is information for identifying a series of electronic data under transaction. In addition, FIG. 9B-1 shows an example of Result (AcceptedWaiting) representing that the requested submission data is accepted, and another submission processing is also possible.

A preflight result description portion 907 includes the result of preflight by the printing company system. For example, the file name of submission data that has undergone the preflight and the result of the preflight are included.

FIG. 9C-1 shows an example of data of the document submission command 809, and FIG. 9C-2 shows another example of data of the response 811. These are different from the document submission command 806 shown in FIG. 9B-1 only in the date/time information in the document submission command 809 issued by the orderer systems 101, 102, and 103 or the document submission information portion 904 received by the printing company systems 104, 105, and 106.

The prepress process 816 shown in FIG. 8 is executed by workflow processing in the printing company systems 104, 105, and 106 during the period after the document submission command 806 shown by the example in FIG. 9B-1 is received until the document submission command 809 shown by the example in FIG. 9C-1 is received. In this case, the printing company systems 104, 105, and 106 cannot accept another submission processing, as described above. Hence, FIG. 9C-2 shows an example in which the document submission response description portion 906 in the response 811 represents that the requested submission data is accepted, and another submission processing is impossible.

Example of Workflow

Figure 10:
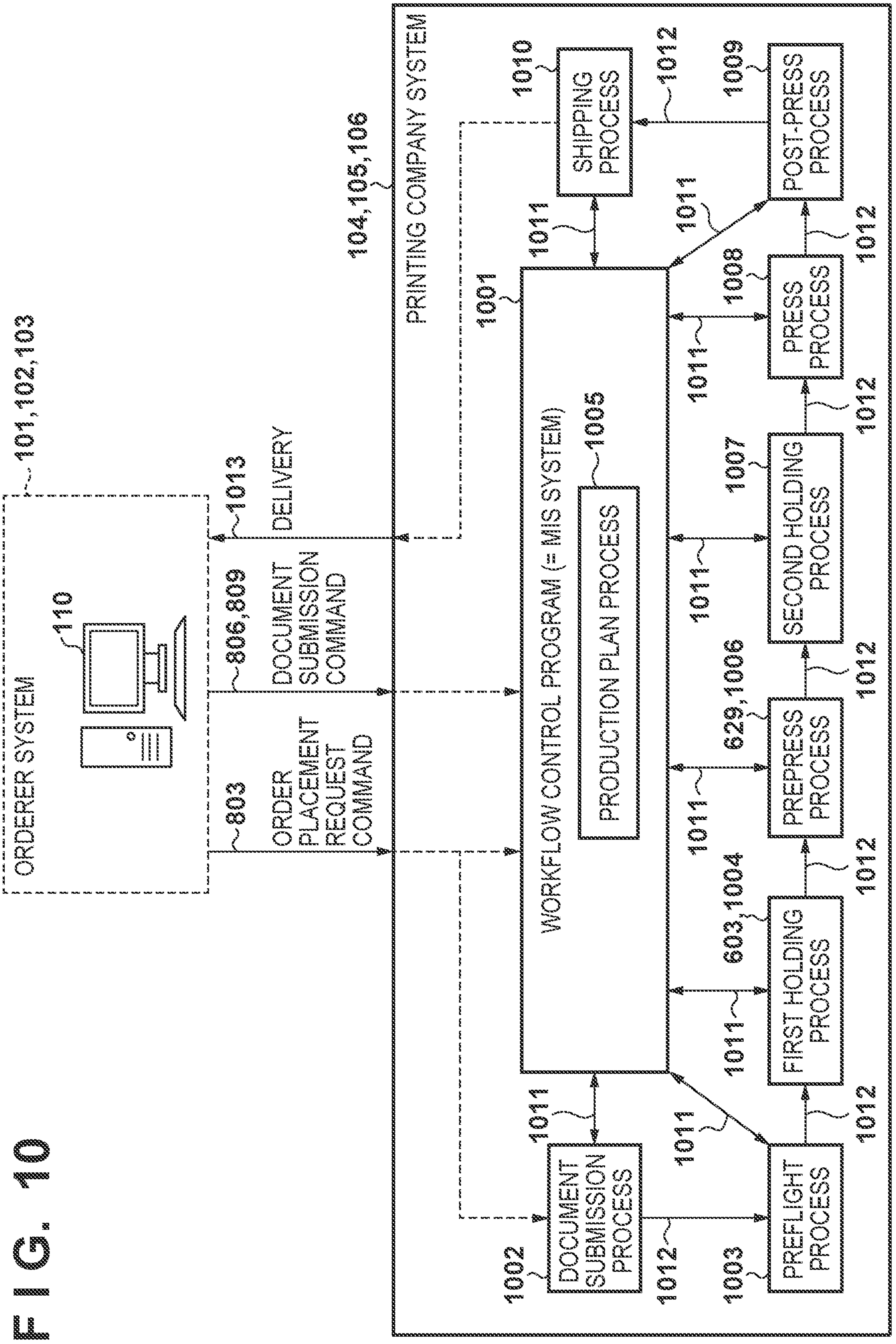
FIG. 10 is a view showing the configuration of a workflow executed and controlled by the second information processing apparatus according to the first embodiment.

FIG. 10 is a view for explaining an example of the configuration and operation mechanism of a workflow that is built and operated in the printing company systems 104, 105, and 106 and controls manufacturing of the print product requested from the orderer systems 101, 102, and 103.

As described above with reference to FIG. 1, the orderer systems 101, 102, and 103 and the printing company systems 104, 105, and 106 are connected by the Internet 100. In the connected state, various kinds of commands and responses concerning order placement/order reception of the print product are transmitted/received between the systems.

Details of the operation in a case in which the order placement request 803 from the orderer systems 101, 102, and 103 is received by the printing company systems 104, 105, and 106 will be described below.

The order placement request command 803 is first received by the workflow control program 411 operating on the information processing apparatus 108. As shown in FIGS. 9A-1 to 9C-2, the order placement request command 803 includes the order placement content description portion 902. The order placement content description portion 902 includes various kinds of information and parameters necessary for manufacturing of the print product requested by the orderer. When the contents of the order placement content description portion 902 are analyzed, it is possible to decide the type and order of a workflow built in the printing company systems 104, 105, and 106 and decide what kind of job tickets should be set as instruction information for the job in each process. Also, the workflow control program 411 manages the implementation means of each process under the management of the program. More specifically, the workflow control program 411 manages information representing whether a process should be performed manually or automatically, by a program, or by an apparatus such as an image forming apparatus. In the first embodiment, a system configured to hold these pieces of information by a management table provided inside the workflow control program 411 and change the information as needed is employed. In this embodiment, a job ticket is created in a JDF 1011 format and set or transmitted from the workflow control program 411 to the execution portion of each process. In this embodiment, a system that also implements a processing start instruction of each process, a notification of an end status, and the like by the JDF 1011 is employed.

The execution portions of processes hold a control connection relationship with the workflow control program 411 via the JDF 1011. On the other hand, the processes also hold a control connection relationship of another system with each other by transmitting/receiving output data 1012 between the preceding and subsequent processes.

Even in a state in which submission data is not accepted, instructions to the processes of the workflow are performed in advance as preparation for production processing to be executed after submission data acceptance, and in each process, processing is queued in the form of a job.

However, as the timing of job generation in each process of the workflow and the control method, various timings and methods other than those described in this embodiment may exist. For example, a method can be considered in which when it becomes necessary to execute the next process, the job of the next process is generated. However, even in such a case, based on the contents described in the order placement content description portion 902, the workflow control program 411 needs to grasp, in advance, the types and order of processes that need to be executed to obtain a final product. Hence, this embodiment shows, as an example, a case in which necessary processes are decided in advance, and jobs to be executed in the processes are generated in an initial state and queued in a processing wait state.

The operation after reception of the document submission command 806 by the printing company systems 104, 105, and 106 will be described below. The following description will be made to explain the effects of the present invention, and an example of the operation in a case in which the submission data automatic response portion 627 in FIG. 19B is selected will be described.

After the document submission command 806 is received, at the same time as the document submission command 806, submission data transmitted from the orderer systems 101, 102, and 103 is received in a document submission process 1002. In the document submission process 1002, the presence/absence of the order placement request command 803 corresponding to the received document submission command 806 is inspected. If it is found as the result of processing of the process that authentic submission data, that is, the corresponding order placement request command exists, the submission data is transmitted to a preflight process 1003 as the next process.

In the preflight process 1003, processing to be described next is executed. That is, the format of the submitted data is verified. More specifically, this corresponds to verification processing of determining whether font data is embedded in PDF or whether there is unauthorized reference to an object or ID.

If it is discriminated as the result of processing of the preflight process 1003 that the submitted data is correct, the submission data is transmitted to the first holding process 630 or 1004 as the next process. In the first holding process, various kinds of order placement information included in the order placement request command 803 and the submission data are associated and held up to an appropriate timing. Even if the orderer systems 101, 102, and 103 execute additional document submission or replacement document submission for the same order placement request command 803, the submission data undergoes the document submission process 1002 and the preflight process 1003 and is updated and held in the first holding process 630 or 1004. Even in this case, the submission data is associated with various kinds of order placement information included in the order placement request command 803, updated, and held.

In the first holding process 630 or 1004, the order placement information and the submission data are only associated and held. This plays an important role to solve the problem by this embodiment. This is because the process next to the first holding process 630 or 1004 is the prepress process 629 or 1006 in the system according to this embodiment shown in FIG. 10.

Processing of the prepress process 629 or 1006 that is the process of the subsequent stage of the first holding process 630 or 1004 will be described below.

The prepress process 629 or 1006 is a process in which imposition processing and data conversion processing of submitted data, and additionally, addition of patch images for color management and image addition processing of marks and register marks, which are needed in processes after the prepress process 629 or 1006 are performed. As shown in FIG. 1, the printing company systems 104, 105, and 106 include image forming apparatuses having various functions, performances, and methods to be provided to print product production and also having different mechanisms. For example, in an image forming apparatus that needs a printing plate, like an offset printing press, data conversion from PDF to the TIFF format to produce the plate is executed. Even in a sheet-fed offset printing press that needs no printing plate, there exists a case in which RIP processing is performed in the prepress process 629 or 1006 to reduce time required in print processing, and conversion processing to an image that has undergone RIP is executed. In a digital printing press for continuous sheet, once print processing is started, it is difficult, because of the mechanism, to temporarily stop or resume printing on a continuous roll sheet. For this reason, special imposition processing for compositing plates into a continuous plate or corresponding processing is executed in the prepress process. To perform various kinds of data conversion and processing in the prepress process, in general, much time and labor or human/mechanical man-hour is necessary.

As shown in any case described above, in the prepress process 629 or 1006, much data processing is generally performed for submitted dat. Processed data generated after the prepress process 629 or 1006 is executed is data that is converted into data completely different from the submission data in terms of the data format or digital data contents, although the data is almost equivalent to the submission data in terms of image information. That is, it can be said that the data is newly created by the prepress process. For this reason, if addition or replacement of submission data is done after the prepress processing, it is necessary to discard the data generated in the prepress process 629 or 1006 and perform the processing of the prepress process again. This may greatly lower productivity in the printing company systems 104, 105, and 106.

To prevent this, in the first holding process 630 or 1004, the data submitted from the orderer systems 101, 102, and 103 is held in an unprocessed state to a time as late as possible. If a document submission request aiming at further addition or replacement is received, it is possible to implement reflection of the addition or replacement of submission data by processing of simply adding or replacing submission data without causing lowering of productivity.

As described with reference to FIGS. 7A and 7B, in this embodiment, when implementing digitization of the order placement/order reception work and establishing a practical automatic system based on common specifications, which allow the practice of the industry of the order placement/order reception work of print products, document submission acceptability judgement processing advantageous for both the orderer and the printing company is implemented. Advantages for both include an allowable delay of the time of additional document submission, correction, or replacement without changing the delivery date for the orderer, and an efficient work free from any retracements for the printing company. The first holding process 630 or 1004 can implement such document submission acceptability judgement processing.

The first holding process 630 or 1004 transmits the job and data held by the instruction from a production plan process 1005 to the prepress process 629 or 1006 as the next process.

The production plan process 1005 is a part of the process shown in FIG. 10, and is a process given a slightly unique responsibility. That is, control between the processes, more specifically, discrimination to advance the control from the first holding process 630 or 1004 to the prepress process 629 or 1006 and an execution instruction for that are also performed by the system according to this embodiment. In other words, this is also considered as a part of processing concerning workflow control, and can be performed by the workflow control program 411.

In this embodiment, however, an example is shown in which the production plan process 1005 is defined as an independent process of performing an explicit instruction for advancing the processing from the first holding process 630 or 1004 to the prepress process 629 or 1006 that is the subsequent process. In the processes of the workflow, not only the process of executing clear processing but also the process of performing process control itself is defined as an equivalent process and performs a part of the workflow.

The first holding process 630 or 1004 according to this embodiment is given a responsibility for further increasing the efficiency of processing in the printing company systems 104, 105, and 106 by cooperating with the production plan process 1005. This will be described using an example below.

In the printing company, the target to be achieved is to efficiently utilize expensive assets such as the image forming apparatuses 110, 111, 112 and the like held by the company and suppresses the labor cost of operators who operate the apparatuses, thereby maintaining high productivity as a result. That is, the processes after the prepress process 629 or 1006 are not processes of low cost such as holding of data or job information, but are processes directly associated with productivity and profitability. In these processes, when the operation rate of the apparatus is improved, and the involving time of the operator who operates the apparatus is condensed, high productivity can be achieved.

That is, once the apparatus starts operating, the operation of keeping the apparatus operating intensively to maintain high productivity is also an important condition for the operation of the workflow in the printing company systems 104, 105, and 106. To satisfy this condition, it is important to cause the first holding process 630 or 1004 and the production plan process 1005 to cooperate and make a plan such that a job to be processed in a press process 1008 maintains a high operation rate of the image forming apparatuses 110, 111, and 112 used in the process.

Hence, in the first holding process 630 or 1004, submission data is held such that various kinds of data processing amounts and job amounts to be processed in the prepress process 629 or 1006 of the subsequent stage make the operation rate of the image forming apparatus used in the press process 1008 as high as possible and do not exceed an allowable processing amount. Note that it is also important to maintain and control the first holding process 630 or 1004 to hold submission data such that, for example, the ratio of the scheduled production amount in the producible amount of the next day or a scheduled date/time becomes high.

Controlling a predetermined processing amount held on the circumstances of the producer such that the first holding process 630 or 1004 achieves the object is convenient for the orderer systems 101, 102, and 103 as well. This is because it means that it is possible to implement a system capable of accepting additional document submission or replacement document submission as flexibly as possible when the additional document submission or replacement document submission processing is retained at the stage before advancing to the prepress process 629 or 1006 or a process after that, as described above. At the same time, for the printing company systems 104, 105, and 106 as well, it is possible to implement a system capable of allowing additional and replacement document submission from the orderer in a form that does not generate a load and simultaneously minimizing the influence in consideration of internal affairs concerning the production system of the company.

Note that the press process 1008 is processed by the image forming apparatuses 110, 111, and 112 shown in FIG. 1. In addition, a post-press process 1009 that executes post-processing is performed by various device, for example, a post-processing unit added to the image forming apparatuses 110, 111, and 112 or an independent device such as the laminator 114 in a non-added state. At any rate, processes after the press process 1008 are accompanied with physical processing associated with product manufacturing. Hence, for the same reason as the prepress process 629 or 1006, the degree of lowering of productivity caused by retracement processing that occurs due to addition or replacement processing of submission data is remarkably conspicuous. For this reason, from the viewpoint of productivity and profitability, retracement processing from the process after the press process is difficult to allow.

Finally, the produced and processed print product undergoes a shipping process 1010 and is sent to the orderer that is a requester, that is, delivered 1013. In the sending processing, the charge request 813 and the payment 814 are also simultaneously processed, as described with reference to FIG. 8.

The mechanism provided by the system according to this embodiment as described above can solve the problem that submission processing performed once to a plurality of times separately from order placement and maintaining of high productivity in the printing company are simultaneously implemented.

Processing Procedure by Workflow Control Program

Figure 11:
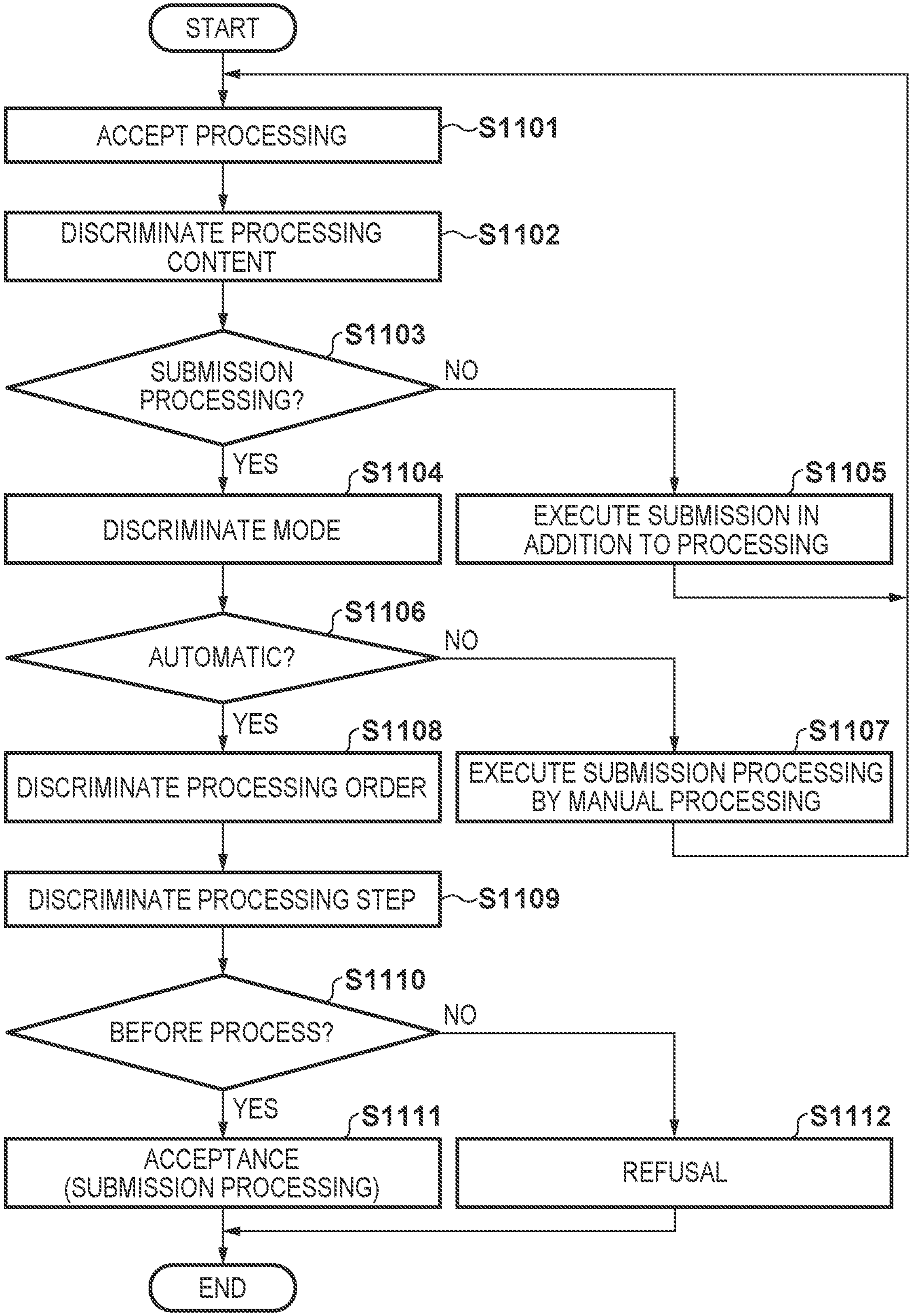
FIG. 11 is a flowchart for explaining acceptance and acceptability discrimination of submission processing according to the first embodiment.

FIG. 11 is a flowchart for explaining mainly the mechanism of the operation of the workflow control program 411, which is the operation of processing judgement of acceptability/non-acceptability of submission processing from the orderer. This processing is performed by the CPU 201 reading out the workflow control program 411 from the HDD 211 and executing it.

In step S1101, the workflow control program 411 accepts a command execution request sent from the orderer systems 101, 102, and 103, whose example is shown in FIGS. 9A-1 to 9C-2.

If a command or data is received from the orderer systems 101, 102, and 103, the process advances to step S1102 to discriminate the type of the received command.

In step S1103, it is judged whether the type of the command received in step S1101, which is discriminated in step S1102, is the document submission command 806. That is, it is determined whether processing to be performed is submission processing. If the result of discrimination of the step is false, the process advances to step S1105 to execute various kinds of commands other than the document submission command 806 shown in FIG. 8, which are received in step S1101.

If it is determined in step S1103 that the received command is the document submission command 806, the process advances to step S1104 to discriminate the set contents of the processing mode at the time of document submission command reception. It is determined whether the discriminated mode is the automatic mode or the manual mode (step S1106). More specifically, discrimination of the set contents means discriminating whether the automatic response portion 627 shown in FIG. 19B is selected.

If the result of discrimination of step S1106 is false, this means that the automatic response portion 627 is not selected. In this case, since the operator of the system processes document submission acceptability by a manual method using the document submission acceptance portion 625 or the document submission non-acceptance portion 626 shown in FIG. 19B, the process advances to step S1107.

If the result of discrimination of step S1106 is true, this means that the automatic response portion 627 is selected. In this case, the process advances to step S1108 to execute processing described with reference to FIG. 10.

In step S1108, first, an order placement command corresponding to the document submission command 806 and information included in it are specified. Specifying is performed by, for example, collating the order ID issued for the order placement command with the order ID added to the document submission command 806. It is determined to which process the workflow corresponding to the specified order placement command is processed by the workflow control program 411.

In step S1109, the process in which the workflow associated with the order placement command discriminated in step S1108 is currently being processed is discriminated. It is judged whether the process is the prepress process or a process after that (step S1110).

The workflow control program 411 manages the order of the processes and the processing progress of each process, as shown in FIG. 10. For example, the workflow control program 411 manages the order ID and the identification information of a process under execution in the workflow associated with order ID in association with each other. In this case, the identification information of the corresponding process under execution is specified from the order ID. If the identification information indicates a specific process (prepress in this example) or a process after that, the determination result of step S1110 is true. In the system according to this embodiment, in steps S1109 and S1110, the workflow control program 411 discriminates the process under execution in this way.

That the result of judgement in step S1110 is false means that the job of the workflow associated with the order placement has not progressed up to the prepress process. In this case, the document submission command 806 can be accepted due to the reason described with reference to FIG. 10. Hence, the process advances to step S1111 to accept the requested document submission command 806. More specifically, submission data is accepted, and the response 808 representing that the document submission command 806 is accepted is returned to the orderer systems 101, 102, and 103.

On the other hand, if the result of judgement in step S1110 is true, this means that the job of the workflow associated with the order placement has progressed up to the prepress process or a process after that. In this case, the document submission command cannot be accepted due to the reason described with reference to FIG. 10. Hence, the process advances to step S1112 not to accept the requested document submission command 806, and the response 811 representing that the document submission command cannot be accepted is returned to the orderer systems 101, 102, and 103.

Note that in the above embodiment, when the printing company notifies the orderer of the start time of prepress that is the specific process by the response to the order placement request or the response to the first document submission, the orderer can know, in advance, the deadline by which the orderer can make document submission.

Alternatively, in step S1111, an estimated time by which document submission is allowed may be added to the response. The estimated time can be decided by adding a time needed to complete the processes until the specific process to the time at which the workflow of the order associated with submission data can be started. Alternatively, if processing of the workflow associated with submission data is already started, the estimated time can be decided by adding a time needed to complete the current process and a time needed to complete processes from the process next to the current process to the specific process to the current time. The time needed for each process may be decided by multiplying the data amount of submission data by a predetermined coefficient for each process.

Note that if it is assumed that submission processing is automated, steps S1104 and S1106 in FIG. 11 may be skipped.

With the above-described configuration and processing, the timing at which document submission is allowed can automatically be decided, and it can be decided, based on the timing, whether to accept new submission data to original submission data. In addition, the order can be notified whether the new document submission is accepted. For the printing company, the decided timing to allow document submission is a timing that does not cause a time-consuming work to be redone, it is possible to suppress lowering of productivity while allowing document resubmission. The first embodiment of the present invention has been described above.

Second Embodiment

In the first embodiment, a technique of automatically discriminating document submission acceptability at the timing of acceptance of the document submission command based on whether the process of the workflow for manufacturing the product according to the order placement linked with the document submission command is the prepress process or a process after that has been described. In the second embodiment of the present invention, further submission processing can be accepted even if the process of the workflow associated with order reception processing is the prepress process or a process after that at the timing of document submission command acceptance. In addition, even in a printing company system, a system that never lowers productivity is provided.

Even in the second embodiment, document submission acceptability judgement is executed based on a prepress process 629 or 1006. The prepress process is the process of performing data conversion or processing, as shown in FIG. 10 of the first embodiment. Hence, if document resubmission or additional document submission occurs for order placement for which the prepress process is being executed reprocessing that is not simple submission data replacement occurs in printing company systems 104, 105, and 106. Accordingly, productivity of print products may greatly lower.

In a conventional system or the system according to this embodiment, a skilled operator carries out works on desktop when processing or converting data in the prepress process. This is because in the prepress process, there exist many regions that cannot depend on a program concerning maintaining of the degree of completion or quality of a product and detection of human errors from the viewpoint of the product recipient.

However, the skilled operator is not always needed for the prepress process. For example, there is a case in which order placement/order reception of a product of a fixed format periodically occurs. In this case, manual processing by an operator in the prepress process according to order reception can be performed by directly applying the operation contents in processing for the previous order. In addition, there is a system that automatically performs prepress processing by a program. In these cases, as described in the first embodiment, heavy load that may lower productivity of submission processing in association with redoing of conversion of various kinds of data and processing, which is executed by the prepress process, is not necessarily generated in the printing company systems 104, 105, and 106.

In consideration of the above-described situation, the second embodiment of the present invention has as its object to cause a system to achieve higher efficiency. That is, in this embodiment, in principal as in the first embodiment, if processing of submission data progresses up to the prepress process or a process after that, document submission associated with the order placement is concluded. However, exceptions are made if it is judged that the prepress process is automatically processed by a program or the like, or previous processing contents are automatically applied in a fixed work mode. In any of the cases, even if the process on the workflow of ordered product production reaches the prepress process, additional document submission or replacement document submission is permitted. On the other hand, if the prepress process is performed by manual processing without automation, as described above, control is performed to permit neither additional document submission nor replacement document submission performed when the process reaches the prepress process. The object of this embodiment is to provide such a system.

Figure 12A:
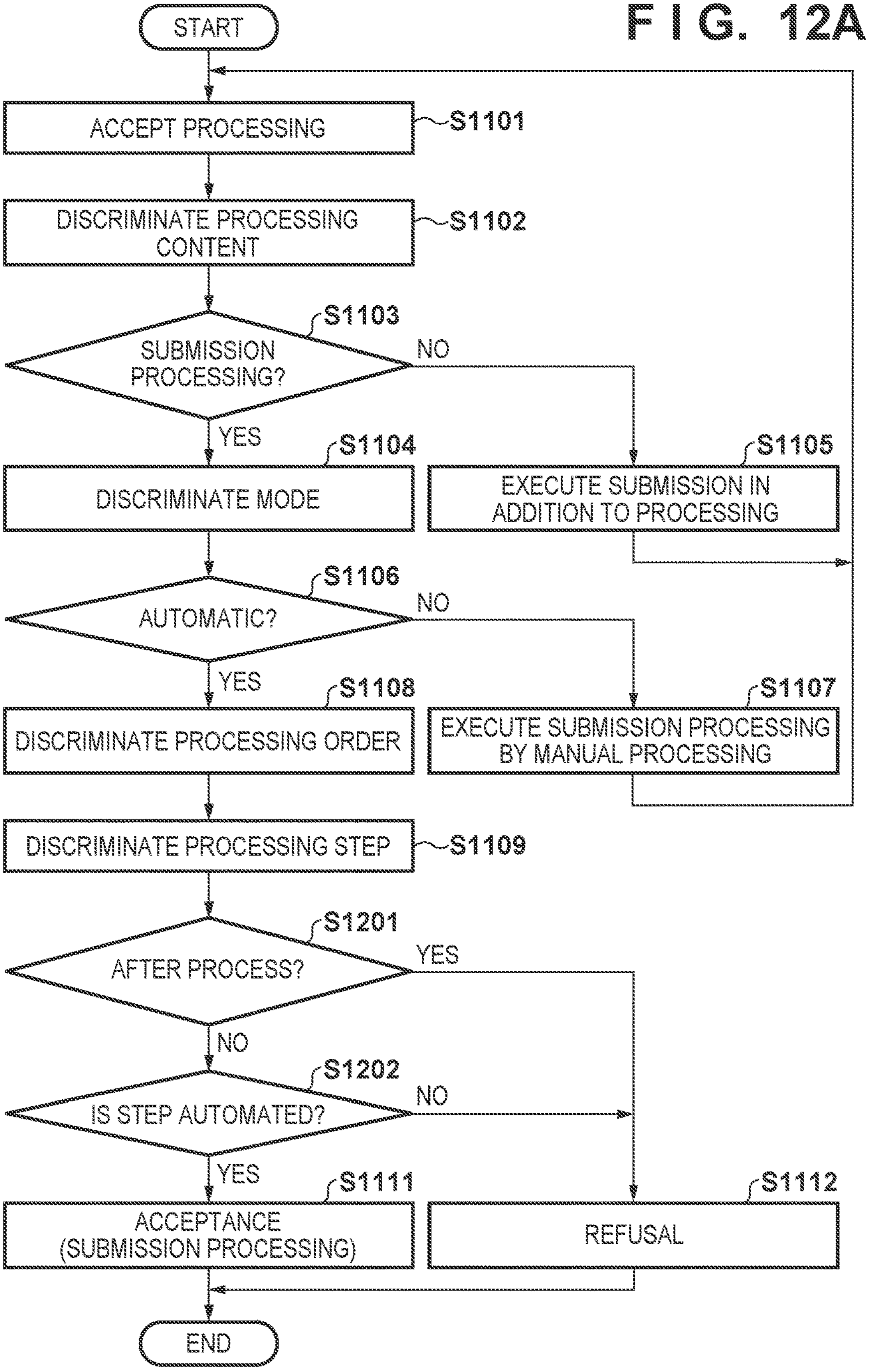
FIG. 12A is a flowchart for explaining acceptance and acceptability discrimination of submission processing according to the second embodiment.

FIG. 12A is a flowchart for explaining mainly the mechanism of the operation of a workflow control program 411 according to the second embodiment of the present invention, which is the operation of processing judgement of acceptability/non-acceptability of submission processing from the orderer. This processing is performed by a CPU 201 reading out the workflow control program 411 from an HDD 211 and executing it. A description will be made below focusing on portions different from FIG. 11 in the first embodiment.

If it is discriminated, in step S1201, that the current processing step is a process before the prepress process 629 or 1006, further discrimination processing is performed in step S1202. That is, it is discriminated whether processing in each process before the prepress process 629 or 1006 is automated processing. In this embodiment, whether processing of each process of the workflow is automated is stored in advance in the workflow control program 411 as a part of the setting information of the workflow. Hence, in step S1202, it is determined, by referring to the information, whether each process before the current process in the workflow under execution is automated.

Upon determining, based on the discrimination result in step S1202, that each process before the current process is automated, much time and labor or human/mechanical man-hour does not occur in various kinds of data conversion or processing as described with reference to FIG. 10 in the first embodiment. Alternatively, the time and man-hour needed for each process before the current processing step are reduced by the automated system. Hence, in this case, for example, even if the current processing step is the prepress process 629 or 1006, it can be considered that productivity in the printing company systems 104, 105, and 106 is lowered little by new document submission. For this reason, since additional document submission or replacement document submission can be permitted, the process advances to step S1111.

On the other hand, if it is determined, based on the discrimination result in step S1202, that the prepress process 629 or 1006 is not automated, that is, the prepress process 629 or 1006 is executed manually, much time and labor or human/mechanical man-hour occurs in various kinds of data conversion or processing. Hence, in this case, if the current processing step is the prepress process 629 or 1006, it is judged that productivity in the printing company systems 104, 105, and 106 is largely lowered by new document submission. For this reason, since additional document submission or replacement document submission cannot be permitted, the process advances to step S1112. The second embodiment of the present invention has been described above.

Note that in the second embodiment, an example in which processes before the current processing step are automated has been described. However, if it is assumed that all processes before the prepress process 629 or 1006 are automated, as shown in FIG. 10, it may be determined whether the current processing step is the prepress process, and if so, it may be determined whether the prepress process is automated. The determination is done in processes S1201 and S1202 of FIG. 12A. In this case, if the current processing step is a process before the prepress process, new document submission may be accepted. If the current processing step is a process after the prepress process, document submission may be refused.

FIG. 12B shows an example of a management table provided in the workflow control program 411. As shown in FIG. 10, the management table holds information representing whether each process is manually processed or automatically processed. In addition, the management table manages information about an implementation means and a processing means of each process, that is, whether each process is performed by a program or an apparatus such as an image forming apparatus. As shown in FIG. 12B, the management table is formed by three fields, that is, a process identification field 1202, an execution means identification field 1203, and an auto/manual discrimination field 1204.

FIG. 12B shows an example of the management table provided inside the workflow control program 411 in the second embodiment. As shown in FIG. 12B, in the management table, the value of the prepress process 1006 in the auto/manual discrimination field 1204 is manual 1205. In this embodiment, a configuration that executes discrimination processing in step S1201 of FIG. 12A by the workflow control program 411 referring to the value in the field is employed. As the management table configuration method, various forms other than that shown in FIG. 12B can exist. However, the embodiment of the present invention can be applied to any configuration if information to be discriminated is managed and provided to the workflow control program 411 in a referable form, as a matter of course. Note that the management table is set by the printing company when creating a workflow.

In this embodiment, in a case in which the current processing step is the prepress process, it is decided, based on whether the process is automated, whether to accept new document submission. In addition to this, for example, if the current processing step is a process before a press process, and all processes up to the current processing step (including the current processing step) are automated, new document submission may be accepted. In the example of the workflow shown in FIG. 10, only the second holding process exists between the prepress process and the press process. The configuration can also be applied to a case in which another process is further included. In the press process, printing on a sheet is executed. Hence, new document submission may be rejected if the current processing step is the press process or a process after that. In this case, in step S1110 of FIG. 12A, it is determined whether the current processing step is a process before the press process. If the current processing step is a process before the press process, in step S1201, it is determined whether all processes before the current processing step are automated. If YES in step S1201, new document submission is accepted. When such processing is performed, automation of the document submission process is already determined in step S1106. Hence, in step S1201, determination of automation of the document submission process may be omitted. With this processing, before execution of the press process, new document submission can be accepted depending on the condition.

According to the configuration and procedure of the above-described second embodiment, if the current processing step is a process before the press process, acceptance of new submission data to original submission data is permitted on condition that the current process and all processes before that are automated. This can further delay the time of document resubmission for the orderer. For the printing company, it is possible to suppress waste of labor and other resources caused by retracements of processes.

Third Embodiment

The third embodiment of the present invention will be described below. In FIG. 10, a production plan process 1005 creates a production plan such that the use efficiency of image forming apparatuses 110, 111, and 112 used in a press process 1008 becomes high, as described above. On the other hand, the number of jobs in the press process is sometimes smaller than the number of jobs to be achieved by the image forming apparatuses 110, 111, and 112, or the number of jobs of the production plan made aiming at the achievement. In this case, the actual operation rate of the image forming apparatus in the press process becomes lower than the assumption or the plan. In other words, the actual production amount does not reach the production amount per unit time planned by the production plan process 1005 based on the production capability, and there is a margin in the production capability. Alternatively, if there is a time to the delivery date, the production capability is not completely used at the stage of production plan, and there may be a margin left. A production plan may be made such that production is completed with a margin left to the delivery date by using the whole production capability.

Under such a condition, there may exist a case in which even if an additional document submission or replacement document submission request is accepted, and processing is executed retroactively from the document submission process, no trouble occurs concerning the production plan and, more particularly, the deadline of delivery. The case in which the production plan is not troubled is a case in which the processing time needed to redo processes upon accepting new document submission can be absorbed by the press process.

In the third embodiment of the present invention, when an additional document submission or replacement document submission request is accepted, the production plan process 1005 discriminates the current margin in the production capability of the press process 1008. If it is discriminated that the production capability has a margin, the document submission is accepted. If it is discriminated that the production capability does not have a margin, control can be performed not to accept the document submission. In particular, document submission is preferably accepted if the time needed to redo the workflow from submission processing based on new submission data can be absorbed by the margin in the production capability.

Figure 13:
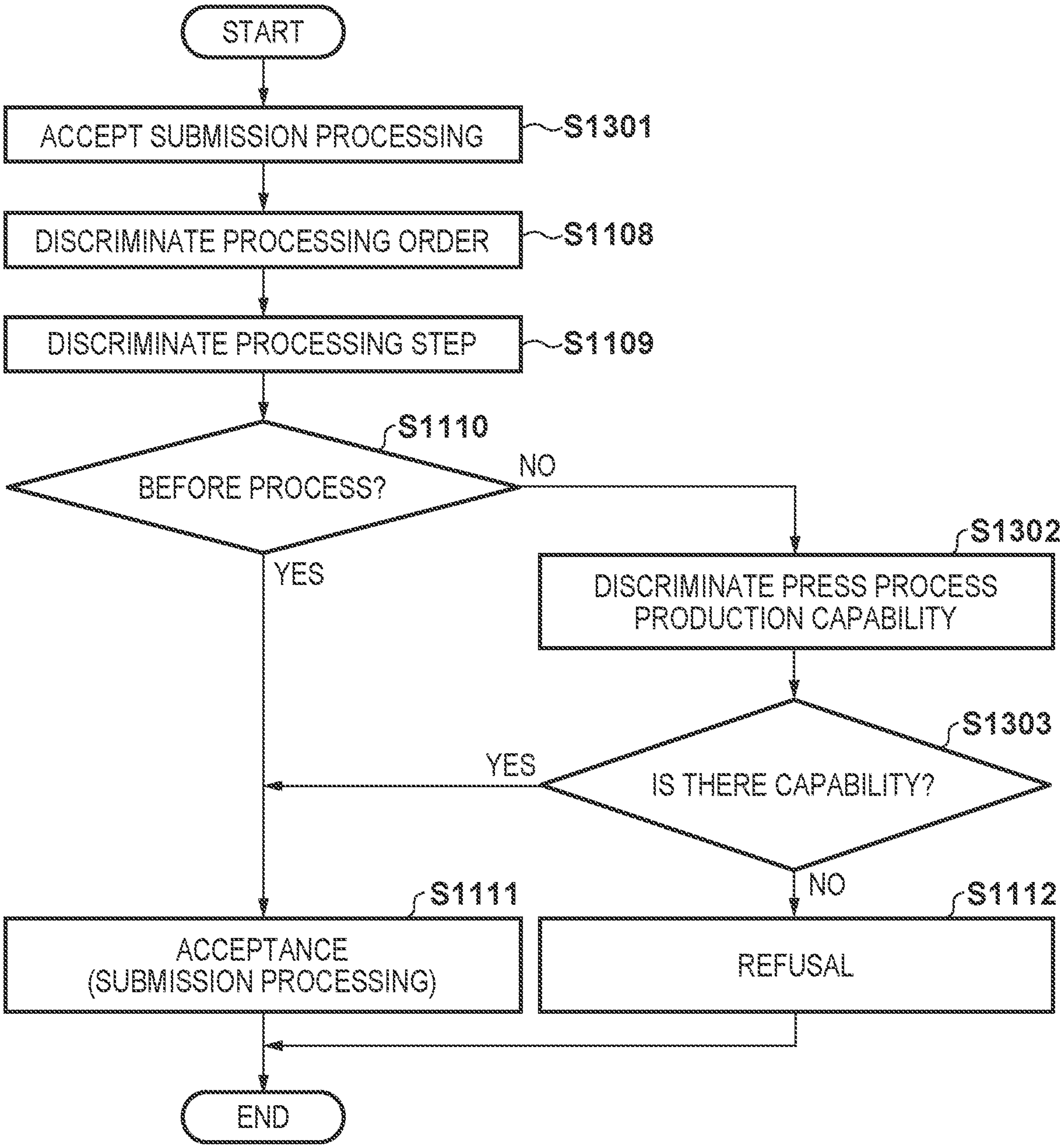
FIG. 13 is a flowchart for explaining acceptance and acceptability discrimination of submission processing according to the third embodiment.

FIG. 13 is a flowchart for explaining mainly the mechanism of the operation of a workflow control program 411 according to the third embodiment of the present invention, which is the operation of discriminating processing judgement of acceptability/non-acceptability of submission processing from the orderer based on the margin in the production capability. This processing is performed by a CPU 201 reading out the workflow control program 411 from an HDD 211 and executing it. A description will be made below focusing on portions different from FIG. 11 in the first embodiment. A description of processes already described with reference to FIG. 11 or FIG. 12A will be omitted, or the processes corresponding to the repetitive description are omitted in FIG. 13.

In step S1301, a submission processing command is accepted. Order placement corresponding to the submission processing command and the current processing step of the workflow associated with the order placement are specified (processes S1108 and S1109). In step S1110, it is discriminated whether the processing step of the workflow associated with the order placement corresponding to the submission processing command is a prepress process or a process after that.

If the result of discrimination of step S1110 is false, the current processing step is a first holding process 1004 or a process before that in the processes of the workflow shown in FIG. 10. In this case, the time needed to redo the processing is short, and it is not necessary to consider the margin in the production capability after the press process. Hence, in step S1301, the document submission command is accepted (step S1111), and submission processing for the accepted submission data is performed.

On the other hand, a case in which the result of discrimination of step S1110 is true corresponds to a case in which the processing of the workflow progresses to the prepress process or a process after that. In this case, a time may be needed for the prepress process. Hence, the process further advances to step S1302 to discriminate (or estimate) the margin in the production capability in the press process. This discrimination processing is derived from the production plan process 1005 in FIG. 10 for the submission data of the current processing target or information such as the difference between the scheduled production amount of the press process 1008 managed by the workflow control program 411 and the maximum production capability of the image forming apparatus.

In step S1303, the discrimination result of step S1302 is evaluated. If it is discriminated that there is a margin in the production capability, the process advances to step S1111 to accept the submission processing command accepted in step S1301. That is, even if the processing of the workflow progresses up to the prepress process, the margin in the production capability, which is other information, is taken into consideration. This makes it possible to provide, by the third embodiment of the present invention, a system capable of more flexibly executing additional document submission or replacement document submission without giving disadvantages to the printing company or the orderer.

If it is judged, as the result of discrimination of step S1303, that there is no margin in the production capability, the process advances to step S1112 to refuse the submission processing command accepted in step S1301.

Note that in step S1303, instead of simply determining the presence/absence of the margin in the production capability of the press process, the presence/absence of the margin in the production capability, which can absorb the time needed to redo processing upon accepting new document submission, may be determined. In this embodiment, the time needed to redo processes after the prepress process is considered as the time needed to redo processing. Hence, the time needed to redo may be estimated, and if the estimated time is equal to or less than the time shortened by the margin in the production capability, it may be determined in step S1301 that there is the margin in the production capability. Here, a case in which the prepress process needs a time may be limited to a case in which the prepress process is performed by a manual work.

In this case, the work time of the manual work may be estimated by, for example, predetermined standard work time per unit data amount (for example, one page)×data amount. Also, the time shortened by the margin in the production capability may be estimated by assigning a part of production to an image forming apparatus that is not used in the current production plan. For example, when production is currently performed using one apparatus, and another apparatus that is not used at present is used, the time needed for the press process is halved. Hence, the time can be estimated as the shortened time.

Also, in step S1301, the time needed to redo the workflow may be added to the work end time for the original submission data before new document submission to estimate a new work end time, and it may be determined whether the time is earlier than the time to start a delivery work. In this case, if the new work end time is earlier than the time to start the delivery work, it is determined in step S1301 that there is a margin.

Also, in FIG. 13, it is determined whether the current processing step is the prepress process or a process after that (step S1110). If YES in step S1110, it may be determined whether the current processing step is a process before the press process, and if YES, the process may branch to step S1302. In this case, if the current processing step is a process after the press process, the process branches to step S1112 to refuse document submission. This is because when the press process is started, a printed print product needs to be discarded to redo the process.

The system according to the third embodiment of the present invention has been described above. According to the above-described configuration and procedure, even if a workflow associated with an order progresses up to a process after the prepress process, if it is determined that there is a margin in the capability for the press process, new document submission can be accepted. Alternatively, even if a workflow associated with an order progresses up to a process after the prepress process, if it is determined that the workflow can be completed before the delivery date, new document submission can be accepted. This allows the orderer to delay the document submission time, and allows the printing company to suppress a loss caused by retracements of processes.

Fourth Embodiment

The fourth embodiment of the present invention will be described below. In the third embodiment, a system that discriminates acceptability of additional document submission or replacement document submission in accordance with the surplus production capability of the press process planned by the production plan process 1005 and executes processing has been described. There may exist a case in which even in a case in which processing is executed retroactively from a prepress process 629 or 1006, if a production plan process 1005 executes another discrimination processing, no trouble occurs in production.

For example, image forming apparatuses 110, 111, and 112 held by printing company systems 104, 105, and 106 are not always in an operating state. There is a case in which it is known in advance that an image forming apparatus is in a non-operating state due to a reason such as maintenance of the image forming apparatus or a non-working day. In such a case, even if additional document submission or replacement document submission is done after the end of the prepress process 629 or 1006, the document submission can be accepted by performing reprocessing without any influence on the production plan.

Hence, in the fourth embodiment, it is discriminated, in accordance with the operation plan of the image forming apparatuses 110, 111, and 112, that is, the presence/absence of the non-operating period of the press process, whether to accept additional document submission or replacement document submission even in the end state of the prepress process 629 or 1006.

Figure 14:
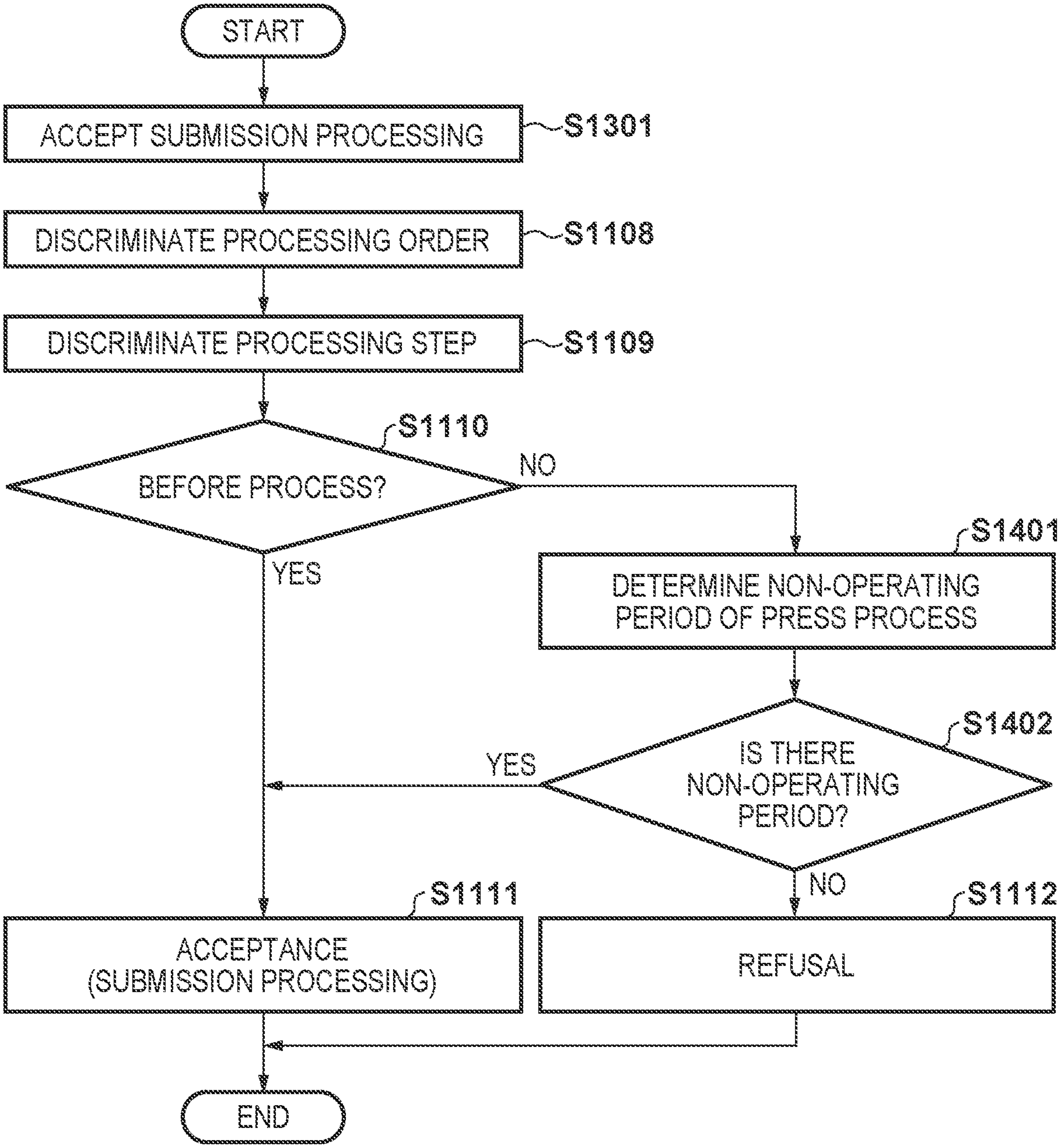
FIG. 14 is a flowchart for explaining acceptance and acceptability discrimination of submission processing according to the fourth embodiment.

FIG. 14 is a flowchart for explaining mainly the mechanism of the operation of a workflow control program 411 according to the fourth embodiment of the present invention, which is the operation of discriminating processing judgement of acceptability/non-acceptability of submission processing from the orderer based on the presence/absence of the non-operating period of the press process. This processing is performed by a CPU 201 reading out the workflow control program 411 from an HDD 211 and executing it. A description will be made below focusing on portions different from FIG. 11 in the first embodiment. A description of processes already described with reference to FIG. 11, 12A, or 13 will be omitted, or the processes corresponding to the repetitive description are omitted in FIG. 14.

In step S1301, a submission processing command is accepted. In step S1110, it is discriminated whether the processing step of the workflow associated with the order placement corresponding to the submission processing command is the prepress process of a process after that.

If the result of discrimination of step S1110 is false, the process advances to step S1111 due to the same reason as described with reference to FIG. 13.

If the result of discrimination of step S1110 is true, this corresponds to a case in which processing progresses to the prepress process or a process after that. In this case, the process advances to step S1401 to specify the non-operating period of the image forming apparatus in the press process and discriminate the presence/absence of the non-operating period (step S1402). The discrimination processing is performed based on production plan information in a press process 1008 managed by the workflow control program 411 in FIG. 10. For example, if production in the press process is not planned in the day next to the day of acceptance of the submission processing command in step S1301, at least the next production is done on the day after next. That is, even if the processing progresses up to the prepress process, and resubmitted data is reprocessed retroactively again in the prepress process, it is judged that the influence on the productivity of the press process is substantially absent.

Hence, the process advances to step S1111 to accept the submission processing command accepted in step S1301. On the other hand, if production in the press process is planned in the next day as the result of discrimination of step S1402, productivity may be lowered by redoing the prepress process. Hence, the process advances to step S1112, and the document submission request command is not accepted in this case.

Note that in FIG. 14, it is determined whether the current processing step is the prepress process or a process after that (step S1110). If YES in step S1110, it may be determined whether the current processing step is a process before the press process, and if YES, the process may branch to step S1401. In this case, if the current processing step is a process after the press process, the process branches to step S1112 to refuse document submission. The system according to the fourth embodiment of the present invention has been described above. According to the configuration and procedure, if the image forming apparatus has a non-operating period, new document submission can be accepted even if the current processing step is a process after the prepress process. Note that the presence of the non-operating period of the image forming apparatus can be considered as the margin in the production capability. In this consideration, it can be said that this embodiment is a variation of the third embodiment. Hence, the orderer can delay the document submission time, and allows the printing company can suppress a loss caused by retracements of processes.

Fifth Embodiment

The fifth embodiment of the present invention will be described below. As described with reference to FIG. 1 in the first embodiment, printing company systems 104, 105, and 106 are known to include image forming apparatuses 110, 111, and 112 in various forms, and selectively use these in accordance with the conditions of order placement or the contents of a product. For example, the cut sheet type digital image forming apparatus 110 directly analyzes submission data such as PDF, performs RIP, and executes print processing. On the other hand, the offset type image forming apparatus 112 needs to execute printing plate processing by CTP as a part of a prepress process. In other words, the offset type image forming apparatus 112 cannot directly process submitted data, unlike the cut sheet type digital image forming apparatus 110.

In the fifth embodiment of the present invention, a MIS system 411 discriminates the acceptability of additional document submission or replacement document submission in the end state of a prepress process 629 or 1006 depending on the methods of the image forming apparatuses 110, 111, and 112 that perform press processing. That is, in the image forming apparatus 112 using a method requiring printing plate processing, additional document submission or replacement document submission in the prepress process 629 or 1006 is not accepted. On the other hand, in the image forming apparatus 110 using a method that does not need printing plate processing, additional document submission or replacement document submission is accepted.

FIG. 15 is a flowchart for explaining mainly the operation of the workflow control program 411 according to the fifth embodiment of the present invention, which is a mechanism that judges acceptability/non-acceptability of submission processing from the orderer based on the type of a printing press to be used in the press process. This processing is performed by a CPU 201 reading out the workflow control program 411 from an HDD 211 and executing it. A description will be made below focusing on portions different from FIG. 11 in the first embodiment. A description of processes already described with reference to FIG. 11, 12A, or 13 will be omitted, or the processes corresponding to the repetitive description are omitted in FIG. 15.

In step S1301, a submission processing command is accepted. In step S1110, it is discriminated whether the processing step of the workflow associated with the order placement corresponding to the submission processing command is a prepress process or a process after that.

If the result of discrimination of step S1110 is false, the process advances to step S1111 due to the same reason as described with reference to FIG. 13. If the result of discrimination of step S1110 is true, this corresponds to a case in which processing progresses to the prepress process or a process after that. In this case, the process advances to step S1501 to discriminate the type of the printing press to be used in the press process. The type of the printing press is discriminated based on production plan information in a press process 1008 managed by the workflow control program 411 in FIG. 10. More specifically, it is discriminated whether production is performed using the digital press 110 or 111 that does not need printing plate processing or the offset type printing press 112 that needs printing plate processing.

That is, in the digital press 110 or 111 that does not need printing plate processing, prepress processing is unnecessary, and if necessary, the work amount is very small. On the other hand, the offset type printing press 112 needs a printing plate. Once the plate is created, creating it again is not preferable from the viewpoint of cost and time.

Hence, in step S1502, the procedure is switched in accordance with the type of the apparatus to be used in the press process. If the printing press to be used in the press process is a digital press as the result of discrimination of step S1501, it is judged that the prepress process is unnecessary, as described above, or if processing is redone, the processing amount is very small. For this reason, the process advances to step S1111 to accept the submission processing command in step S1301. On the other hand, in a printing press that is not a digital press and needs a printing plate, redoing the prepress processing requires much labor. Hence, the process advances to step S1112 to refuse the submission processing command in step S1301.

Note that in FIG. 15, it is determined whether the current processing step is the prepress process or a process after that (step S1110). If YES in step S1110, it may be determined whether the current processing step is a process before the press process, and if YES, the process may branch to step S1501. In this case, if the current processing step is a process after the press process, the process branches to step S1112 to refuse document submission.

The system according to the fifth embodiment of the present invention has been described above. According to the configuration and procedure, the load of processing of the prepress process is determined based on the necessity of a printing plate, and it can be decided, by simple determination, whether to accept new document submission. This allows the orderer to delay the document submission time, and allows the printing company to suppress a loss caused by retracements of processes.

Sixth Embodiment

The sixth embodiment of the present invention will be described below. In the above-described embodiments, the format of data to be submitted in the printing company is assumed to be the PDF data format that is widely and generally used. PDF data is generally converted into a format such as TIFF suitable for CTP processing by an image forming apparatus 112 in a prepress process 629 or 1006.

If submission data is not in PDF but in the TIFF format, conversion processing in the above-described prepress process 629 or 1006 is unnecessary. In other words, if data is submitted in a format that does not need data conversion processing or processing associated with additional document submission or replacement document submission, reprocessing of the prepress process 629 or 1006 is unnecessary. For this reason, productivity does not lower.

Hence, the sixth embodiment of the present invention provides a system capable of controlling to discriminate the type of submission data and discriminate, based on the type of the data, acceptability of additional document submission or replacement document submission for a job that has undergone the processing of the prepress process 629 or 1006.

Figure 16:
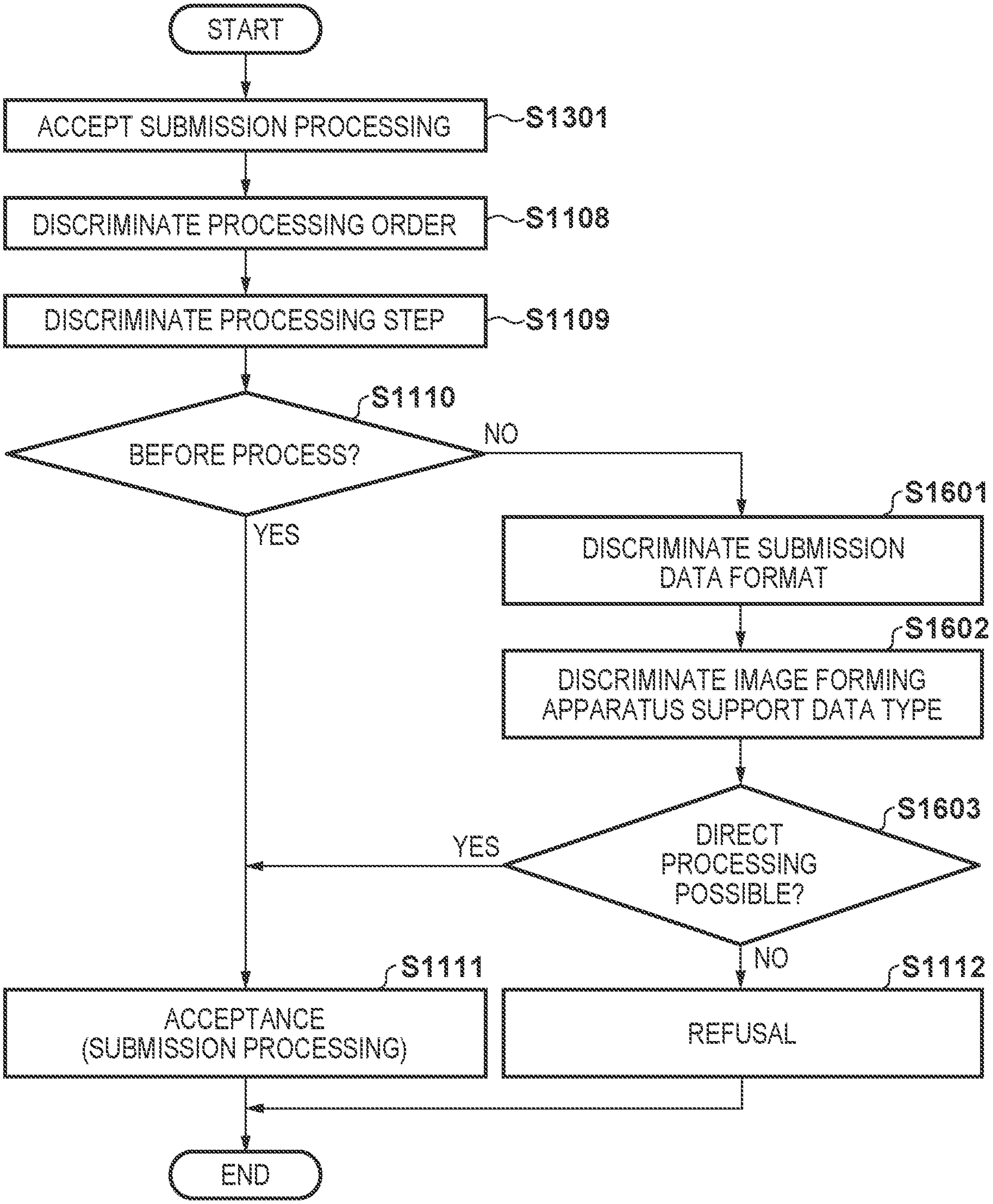
FIG. 16 is a flowchart for explaining acceptance and acceptability discrimination of submission processing according to the sixth embodiment.

FIG. 16 is a flowchart showing the operation of a workflow control program 411 according to the sixth embodiment of the present invention. In FIG. 16, processing judgement of acceptability/non-acceptability of submission processing from the orderer is performed based on the type of submission data and the type of support data of a printing press to be used in a press process. This processing is performed by a CPU 201 reading out the workflow control program 411 from an HDD 211 and executing it. A description will be made below focusing on portions different from FIG. 11 in the first embodiment. A description of processes already described with reference to FIG. 11, 12A, or 13 will be omitted, or the processes corresponding to the repetitive description are omitted in FIG. 16.

In step S1301, a submission processing command is accepted. In step S1110, it is discriminated whether the processing step of the workflow associated with the order placement corresponding to the submission processing command is a prepress process or a process after that.

If the result of discrimination of step S1110 is false, the process advances to step S1111 due to the same reason as described with reference to FIG. 13.

If the result of discrimination of step S1110 is true, this corresponds to a case in which processing progresses to the prepress process or a process after that.

In this case, the process advances to step S1601 to identify the type of data that has undergone submission processing in step S1301, that is, the data format. The process advances to step S1602 to discriminate the type of a data format that the printing press to be used in the press process can directly handle. In the example of this embodiment, discrimination processing in processes S1601 and S1602 is performed by the workflow control program 411 shown in FIG. 10.

In step S1603, another discrimination based on the information discriminated in processes S1601 and S1602 is executed. That is, it is discriminated whether the data format of the submission data accepted in step S1601 corresponds to a data format that the printing press to be used in the press process can directly handle. In other words, it is determined whether the type of the image forming apparatus can process the submission data. If the result of discrimination of this process is true, data type conversion processing of the submitted data is not performed in the prepress process. In this case, data conversion processing in the prepress process is unnecessary. In other words, even if additional document submission or replacement document submission is performed after completion of processing of the prepress process, reprocessing that occurs is minor or absent. Hence, in this case, the process advances to step S1111 to accept the submission processing command in step S1301.

On the other hand, if the result of discrimination of step S1603 is false, the submitted data undergoes data type conversion processing in the prepress process. In this case, additional document submission or replacement document submission performed after completion of the prepress process causes reprocessing of the prepress process, and processing needed to redo the process cannot be considered as minor. Hence, in this case, the process advances to step S1112 to refuse the submission processing command in step S1301.

Note that in FIG. 16, it is determined whether the current processing step is the prepress process or a process after that (step S1110). If YES in step S1110, it may be determined whether the current processing step is a process before the press process, and if YES, the process may branch to step S1601. In this case, if the current processing step is a process after the press process, the process branches to step S1112 to refuse document submission.

The system according to the sixth embodiment of the present invention has been described above. According to the configuration and procedure, the load of processing of the prepress step is determined based on the necessity of a printing plate, and it can be decided, by simple determination, whether to accept new document submission. This allows the orderer to delay the document submission time, and allows the printing company to suppress a loss caused by retracements of processes.

Seventh Embodiment

The seventh embodiment of the present invention will be described below. The above-described embodiments are related to a system that automatically discriminates acceptability of additional document submission or replacement document submission based on various conditions. However, the same effect can be obtained even by a non-automatic discrimination method. The seventh embodiment provides a system using such a method.

That is, as a response 805 to an order placement request command 803, printing company systems 104, 105, and 106 transmit information about the deadlines of document resubmission, additional document submission, and replacement document submission to orderer systems 101, 102, and 103. It is then discriminated whether to accept document submission with respect to the deadline as the boundary. It is also possible to employ a configuration in which the orderer systems 101, 102, and 103 transmit, by the order placement request command 803, information about the deadline of document submission to the printing company systems 104, 105, and 106.

In any case, the information about the deadlines is held in a production plan process 1005, and discrimination and control when submission processing is performed based on the held information are performed. The above is the system according to the seventh embodiment of the present invention.

Figure 17:
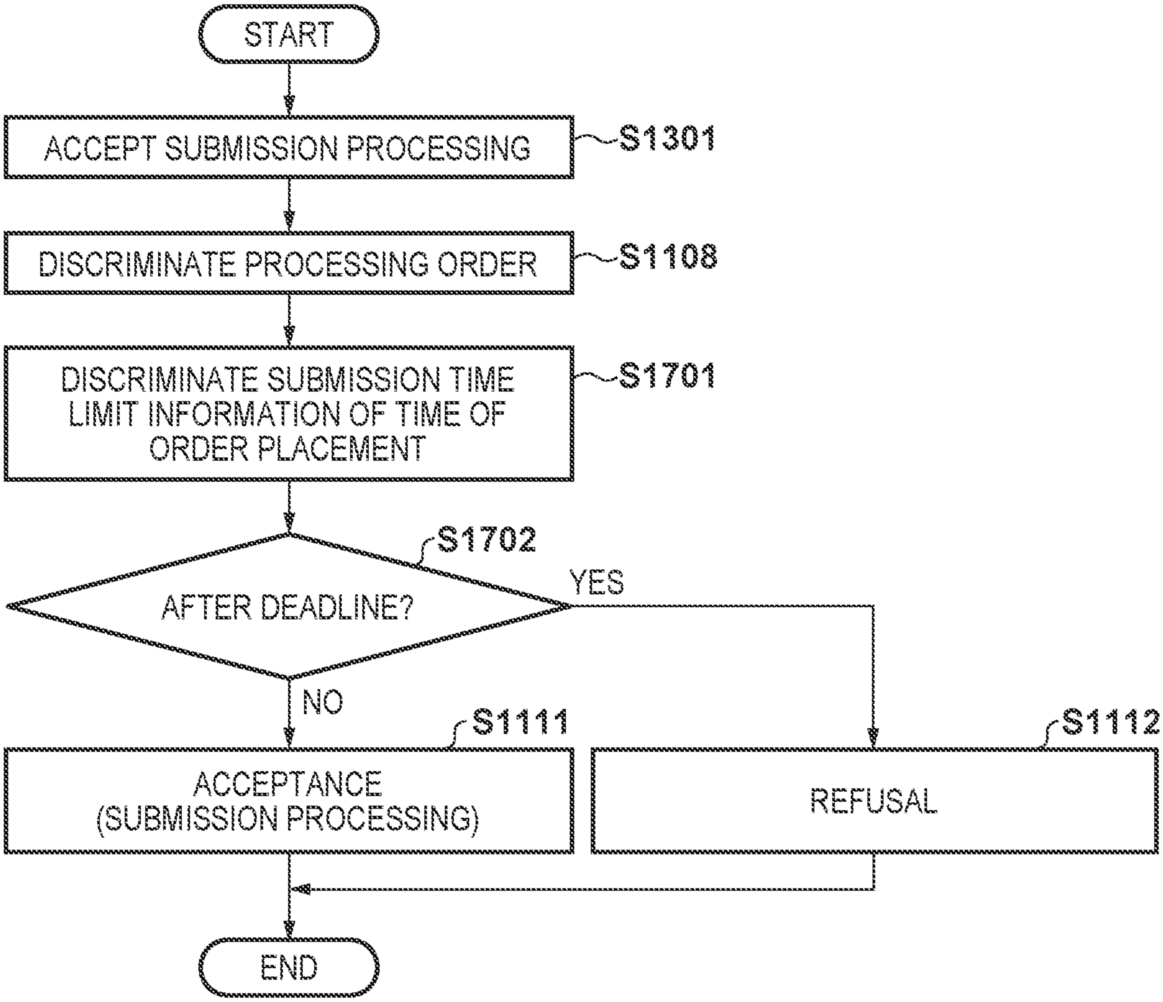
FIG. 17 is a flowchart for explaining acceptance and acceptability discrimination of submission processing according to the seventh embodiment.

FIG. 17 is a flowchart for explaining mainly the mechanism of the operation of a workflow control program 411 according to the seventh embodiment of the present invention, which is the operation of judging acceptability at the time of submission processing based on the information of the deadline of document submission designated at the time of order placement by the orderer. This processing is performed by a CPU 201 reading out the workflow control program 411 from an HDD 211 and executing it. A description will be made below focusing on portions different from FIG. 11 in the first embodiment. A description of processes already described with reference to FIG. 11, 12A, or 13 will be omitted, or the processes corresponding to the repetitive description are omitted in FIG. 17.

In step S1301, a submission processing command is accepted. Also, in step S1108, order placement information as the base of submission processing performed in step S1301 is specified, and information about the deadline of document submission set by the orderer, which is included in the order placement information, is discriminated. The information about the deadline of document submission can be expressed by any method, for example, as a specific date/time or a deadline counted from the order placement time.

In step S1702, it is discriminated whether submission processing command reception performed in step S1301 is after the deadline discriminated in step S1701.

If the result of discrimination is false, this means that the submission processing command accepted in step S1301 does not exceed the deadline yet. Hence, the process advances to step S1111 to accept the submission processing command accepted in step S1301. On the other hand, if the result of discrimination of step S1702 is true, the submission processing command accepted in step S1301 exceeds the deadline. Hence, the process advances to step S1112 to refuse the submission processing command.

According to the above-described embodiment, it is possible to provide the mechanism of an order placement/order reception work convenient for users, that is, both the orderer and the recipient. That is, it is possible to provide a mechanism configured to simultaneously implement the circumstances of the orderer who executes submission processing a plurality of times at a timing different from order placement processing and efficient execution of workflow processing of the printing company that efficiently conducts contracted production of a print product, and a system. This makes it possible to implement a realistic and efficient electronic order placement/order reception system for a print product while satisfying both the requirements of the orderer and the requirements of the printing company as much as possible.

Note that in this embodiment, the printing company system may notify the orderer system that is the document submission source of the deadline of document submission at the time of order and may also notify the orderer system of the next deadline of document submission every time document submission is newly performed. In the printing company system, when new document submission is performed, the deadline is compared to the finally notified deadline in step S1702. If the deadline is not changed, the notification may be omitted. In addition, if it is known that a document cannot be submitted any more, the orderer system may be notified of it or the current date/time as the deadline. Concerning this notification, the embodiment may be combined with each of the first to sixth embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087811, filed May 25, 2021 which is hereby incorporated by reference herein in its entirety.

What is claimed is:

1. A workflow control system configured to process received document submission data to produce a print product using a print workflow, comprising:

at least one memory that stores at least one program; and at least one processor that executes the at least one program to operate as:

a document submission unit configured to accept the received document submission data during one or more processing steps of the print workflow; and a determination unit configured to, if new document submission data is received after original document submission data is received and accepted, determine whether a current processing step after acceptance of the original document submission data is a prepress processing step of the print workflow or a processing step subsequent to the prepress processing step of the print workflow, wherein, if the determination unit determines that the current processing step is the prepress processing step or the processing step subsequent to the prepress processing step, the document submission unit is configured not to accept the new document submission data, and otherwise, accept the new document submission data.

2. The system according to claim 1, wherein if the new document submission data is received, the determination unit is further configured to determine whether a document submission process by the document submission unit is automated, and if it is determined that the document submission process is automated, and the current processing step is not the prepress processing step or the processing step subsequent to the prepress processing step, the document submission unit is further configured to accept the new document submission data.

3. The system according to claim 1, wherein if the new document submission data is accepted, the new document submission data is processed in each processing step of the print workflow.

4. The system according to claim 1, wherein if the received document submission data is accepted, a document submission source of the received document submission data is notified of a deadline to accept the new document submission data for the received document submission data.

5. The system according to claim 1, wherein the new document submission data includes replacement or additional document submission data of the original document submission data.

6. A computer-readable storage medium storing a program configured to cause a computer to process received document submission data to produce a print product using a print workflow, wherein the program causes the computer to operate as:

a document submission unit configured to accept the received document submission data during one or more processing steps of the print workflow; and a determination unit configured to, if new document submission data is received after original document submission data is received and accepted, determine whether a current processing step after acceptance of the original document submission data is a prepress processing step of the print workflow or a processing step subsequent to the prepress processing step of the print workflow, wherein, if the determination unit determines that the current processing step is the prepress processing step or the processing step subsequent to the prepress processing step, the document submission unit is configured not to accept the new document submission data, and otherwise, accept the new document submission data.

7. The medium according to claim 6, wherein if the new document submission data is received, the determination unit is further configured to determine whether a document submission process by the document submission unit is automated, and if it is determined that the document submission process is automated, and the current processing step is not the prepress processing step or the processing step subsequent to the prepress processing step, the document submission unit is further configured to accept the new document submission data.

8. The medium according to claim 6, wherein if the new document submission data is accepted, the new document submission data is processed in each processing step of the print workflow.

9. The medium according to claim 6, wherein if the received document submission data is accepted, a document submission source of the received document submission data is notified of a deadline to accept the new document submission data for the received document submission data.

10. The medium according to claim 6, wherein the new document submission data includes replacement or additional document submission data of the original document submission data.

11. A workflow control method for processing, by an information processing apparatus, received document submission data to produce a print product using a print workflow, the control method comprising:

accepting the received document submission data during one or more processing steps of the print workflow;

determining, if new document submission data is received after original document submission data is received and accepted, whether a current processing step after acceptance of the original document submission data is a prepress processing step of the print workflow or a processing step subsequent to the prepress processing step of the print workflow; and if it is determined that the current processing step is the prepress processing step or the processing step subsequent to the prepress processing step, not accepting the new document submission data, and otherwise, accepting the new document submission data.

* * * * *